(12) United States Patent
Kuper et al.

(10) Patent No.: US 10,097,893 B2
(45) Date of Patent: *Oct. 9, 2018

(54) MEDIA EXPERIENCE SOCIAL INTERFACE

(71) Applicant: Sonos, Inc., Santa Barbara, CA (US)

(72) Inventors: Ron Kuper, Arlington, MA (US); Arthur L. Coburn, IV, Lexington, MA (US); John Meyer, Boston, MA (US); Mike Delaney, Billerica, MA (US)

(73) Assignee: Sonos, Inc., Santa Barbara, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 15/227,074

(22) Filed: Aug. 3, 2016

(65) Prior Publication Data

US 2016/0342322 A1 Nov. 24, 2016

Related U.S. Application Data

(63) Continuation of application No. 13/748,357, filed on Jan. 23, 2013, now Pat. No. 9,510,055.

(51) Int. Cl.
*H04N 21/4788* (2011.01)
*H04N 21/436* (2011.01)
(Continued)

(52) U.S. Cl.
CPC ....... *H04N 21/4788* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS 4,296,278 A 10/1981 Cullison et al.
4,816,989 A 3/1989 Finn et al.
(Continued)

FOREIGN PATENT DOCUMENTS

CN 101410773 A 4/2009
EP 0251584 A2 1/1988
(Continued)

OTHER PUBLICATIONS

Non-Final Office Action dated Sep. 10, 2015, issued in connection with U.S. Appl. No. 14/197,403, filed Mar. 5, 2014, 16 pages.
(Continued)

*Primary Examiner* — Michelle Chin
(74) *Attorney, Agent, or Firm* — McDonnell Boehnen Hulbert & Berghoff LLP

(57) ABSTRACT

Embodiments described herein include systems and methods for providing a social interface for sharing media experience information between households in a community. Users of different households may form the community. The social interface may be provided as an application on a mobile device or an Internet webpage as a portal to the community. An example implementation involves a device displaying representations of: a plurality of households; an indication of a selected household; one or more zones within the selected household; and a representation of media being played by a selected zone of the one or more zones. While displaying the representations, the device receives, from a server, data indicating updated information associated with the plurality of households; and, in response, updates the graphical display to display at least an updated representation of media being played by the selected zone.

20 Claims, 12 Drawing Sheets

(51) Int. Cl.

| | | |
|---|---|---|
| *H04N 21/482* | (2011.01) | |
| *G11B 27/10* | (2006.01) | |
| *G11B 27/34* | (2006.01) | |
| *G06F 3/0482* | (2013.01) | |
| *G06F 3/0484* | (2013.01) | |
| *H04L 12/24* | (2006.01) | |
| *H04L 29/08* | (2006.01) | |

(52) U.S. Cl.
CPC ............ *G11B 27/105* (2013.01); *G11B 27/34* (2013.01); *H04L 41/22* (2013.01); *H04L 67/10* (2013.01); *H04N 21/43615* (2013.01); *H04N 21/4825* (2013.01)

(56) References Cited

U.S. PATENT DOCUMENTS

| | | | |
|---|---|---|---|
| 5,182,552 A | 1/1993 | Paynting | |
| 5,239,458 A | 8/1993 | Suzuki | |
| 5,299,266 A | 3/1994 | Lumsden | |
| 5,406,634 A | 4/1995 | Anderson et al. | |
| 5,440,644 A | 8/1995 | Farinelli et al. | |
| 5,467,342 A | 11/1995 | Logston et al. | |
| 5,491,839 A | 2/1996 | Schotz | |
| 5,553,222 A | 9/1996 | Milne et al. | |
| 5,563,946 A | 10/1996 | Cooper et al. | |
| 5,668,884 A | 9/1997 | Clair, Jr. et al. | |
| 5,673,323 A | 9/1997 | Schotz et al. | |
| 5,751,819 A | 5/1998 | Dorrough | |
| 5,761,320 A | 6/1998 | Farinelli et al. | |
| 5,774,666 A | 6/1998 | Portuesi | |
| 5,808,662 A | 9/1998 | Kinney et al. | |
| 5,815,689 A | 9/1998 | Shaw et al. | |
| 5,856,827 A | 1/1999 | Sudo | |
| 5,867,691 A | 2/1999 | Shiraishi | |
| 5,875,354 A | 2/1999 | Charlton et al. | |
| 5,887,143 A | 3/1999 | Saito et al. | |
| 5,923,902 A | 7/1999 | Inagaki | |
| 5,946,343 A | 8/1999 | Schotz et al. | |
| 5,956,088 A | 9/1999 | Shen et al. | |
| 6,002,862 A | 12/1999 | Takaike | |
| 6,009,457 A | 12/1999 | Moller | |
| 6,026,150 A | 2/2000 | Frank et al. | |
| 6,031,818 A | 2/2000 | Lo et al. | |
| 6,032,202 A | 2/2000 | Lea et al. | |
| 6,108,686 A | 8/2000 | Williams, Jr. | |
| 6,128,318 A | 10/2000 | Sato | |
| 6,157,957 A | 12/2000 | Berthaud | |
| 6,175,872 B1 | 1/2001 | Neumann et al. | |
| 6,181,316 B1 | 1/2001 | Little et al. | |
| 6,185,737 B1 | 2/2001 | Northcutt et al. | |
| 6,195,436 B1 | 2/2001 | Scibora et al. | |
| 6,199,169 B1 | 3/2001 | Voth | |
| 6,255,961 B1 | 7/2001 | Van Ryzin et al. | |
| 6,256,554 B1 | 7/2001 | Dilorenzo | |
| 6,308,207 B1 | 10/2001 | Tseng et al. | |
| 6,324,586 B1 | 11/2001 | Johnson | |
| 6,332,147 B1 | 12/2001 | Moran et al. | |
| 6,349,339 B1 | 2/2002 | Williams | |
| 6,351,821 B1 | 2/2002 | Voth | |
| 6,404,811 B1 | 6/2002 | Cvetko et al. | |
| 6,430,353 B1 | 8/2002 | Honda et al. | |
| 6,469,633 B1 | 10/2002 | Wachter | |
| 6,487,296 B1 | 11/2002 | Allen et al. | |
| 6,522,886 B1 | 2/2003 | Youngs et al. | |
| 6,526,325 B1 | 2/2003 | Sussman et al. | |
| 6,587,127 B1 | 7/2003 | Leeke et al. | |
| 6,594,691 B1 | 7/2003 | McCollum et al. | |
| 6,598,172 B1 | 7/2003 | Vandeusen et al. | |
| 6,611,537 B1 | 8/2003 | Edens et al. | |
| 6,631,410 B1 | 10/2003 | Kowalski et al. | |
| 6,674,803 B1 | 1/2004 | Kesselring | |
| 6,728,531 B1 | 4/2004 | Lee et al. | |
| 6,732,155 B2 | 5/2004 | Meek | |
| 6,757,517 B2 | 6/2004 | Chang | |
| 6,778,869 B2 | 8/2004 | Champion | |
| 6,826,283 B1 | 11/2004 | Wheeler et al. | |
| 6,836,788 B2 | 12/2004 | Kim et al. | |
| 6,898,642 B2 | 5/2005 | Chafle et al. | |
| 6,912,610 B2 | 6/2005 | Spencer | |
| 6,920,373 B2 | 7/2005 | Xi et al. | |
| 6,934,766 B1 | 8/2005 | Russell | |
| 6,985,694 B1 | 1/2006 | De Bonet et al. | |
| 7,007,106 B1 | 2/2006 | Flood et al. | |
| 7,017,118 B1 | 3/2006 | Carroll | |
| 7,020,048 B2 | 3/2006 | McComas | |
| 7,020,791 B1 | 3/2006 | Aweya et al. | |
| 7,043,651 B2 | 5/2006 | Aweya et al. | |
| 7,047,308 B2 | 5/2006 | Deshpande | |
| 7,113,833 B1 | 9/2006 | Brown et al. | |
| 7,113,999 B2 | 9/2006 | Pestoni et al. | |
| 7,115,017 B1 | 10/2006 | Laursen et al. | |
| 7,117,451 B2 | 10/2006 | Sielken | |
| 7,124,125 B2 | 10/2006 | Cook et al. | |
| 7,130,608 B2 | 10/2006 | Hollstrom et al. | |
| 7,130,616 B2 | 10/2006 | Janik | |
| 7,143,141 B1 | 11/2006 | Morgan et al. | |
| 7,143,939 B2 | 12/2006 | Henzerling | |
| 7,162,315 B2 | 1/2007 | Gilbert | |
| 7,185,090 B2 | 2/2007 | Kowalski et al. | |
| 7,187,947 B1 | 3/2007 | White et al. | |
| 7,206,367 B1 | 4/2007 | Moore | |
| 7,209,795 B2 | 4/2007 | Sullivan et al. | |
| 7,218,708 B2 | 5/2007 | Berezowski | |
| 7,236,739 B2 | 6/2007 | Chang | |
| 7,236,773 B2 | 6/2007 | Thomas | |
| 7,281,034 B1 | 10/2007 | Eyal | |
| 7,293,060 B2 | 11/2007 | Komsi | |
| 7,295,548 B2 | 11/2007 | Blank et al. | |
| 7,302,468 B2 | 11/2007 | Wijeratne | |
| 7,312,785 B2 | 12/2007 | Tsuk et al. | |
| 7,324,857 B2 | 1/2008 | Goddard | |
| 7,333,519 B2 | 2/2008 | Sullivan et al. | |
| 7,358,960 B2 | 4/2008 | Mak | |
| 7,372,846 B2 | 5/2008 | Zwack | |
| 7,391,791 B2 | 6/2008 | Balassanian et al. | |
| 7,392,102 B2 | 6/2008 | Sullivan et al. | |
| 7,483,538 B2 | 1/2009 | McCarty et al. | |
| 7,483,958 B1 | 1/2009 | Elabbady et al. | |
| 7,496,623 B2 | 2/2009 | Szeto et al. | |
| 7,496,633 B2 | 2/2009 | Szeto et al. | |
| 7,571,014 B1 | 8/2009 | Lambourne et al. | |
| 7,574,274 B2 | 8/2009 | Holmes | |
| 7,599,685 B2 | 10/2009 | Goldberg et al. | |
| 7,630,501 B2 | 12/2009 | Blank et al. | |
| 7,643,894 B2 | 1/2010 | Braithwaite et al. | |
| 7,657,224 B2 | 2/2010 | Goldberg et al. | |
| 7,657,644 B1 | 2/2010 | Zheng | |
| 7,657,910 B1 | 2/2010 | McAulay et al. | |
| 7,668,990 B2 | 2/2010 | Krzyzanowski et al. | |
| 7,669,219 B2 | 2/2010 | Scott, III | |
| 7,675,943 B2 | 3/2010 | Mosig et al. | |
| 7,676,142 B1 | 3/2010 | Hung | |
| 7,702,279 B2 | 4/2010 | Ko et al. | |
| 7,720,096 B2 | 5/2010 | Klemets | |
| 7,725,533 B2 | 5/2010 | Szeto et al. | |
| 7,725,551 B2 | 5/2010 | Szeto et al. | |
| 7,739,271 B2 | 6/2010 | Cook et al. | |
| 7,742,740 B2 | 6/2010 | Goldberg et al. | |
| 7,788,138 B2 | 8/2010 | Viehmann et al. | |
| 7,805,682 B1 | 9/2010 | Lambourne | |
| 7,835,689 B2 | 11/2010 | Goldberg et al. | |
| 7,853,341 B2 | 12/2010 | McCarty et al. | |
| 7,865,137 B2 | 1/2011 | Goldberg et al. | |
| 7,885,622 B2 | 2/2011 | Krampf et al. | |
| 7,916,877 B2 | 3/2011 | Goldberg et al. | |
| 7,917,082 B2 | 3/2011 | Goldberg et al. | |
| 7,921,369 B2 | 4/2011 | Bill | |
| 7,934,239 B1 | 4/2011 | Dagman | |
| 7,987,294 B2 | 7/2011 | Bryce et al. | |
| 7,996,566 B1 | 8/2011 | Sylvain et al. | |
| 8,014,423 B2 | 9/2011 | Thaler et al. | |
| 8,023,663 B2 | 9/2011 | Goldberg | |
| 8,028,038 B2 | 9/2011 | Weel | |

(56) References Cited

U.S. PATENT DOCUMENTS

| | | |
|---|---|---|
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,103,009 B2 | 1/2012 | McCarty et al. |
| 8,112,032 B2 | 2/2012 | Ko et al. |
| 8,131,390 B2 | 3/2012 | Braithwaite et al. |
| 8,169,938 B2 | 5/2012 | Duchscher et al. |
| 8,200,602 B2 | 6/2012 | Farrelly |
| 8,214,873 B2 | 7/2012 | Weel |
| 8,230,099 B2 | 7/2012 | Weel |
| 8,234,395 B2 | 7/2012 | Millington et al. |
| 8,271,115 B2 | 9/2012 | Yoshida |
| 8,290,603 B1 | 10/2012 | Lambourne |
| 8,315,555 B2 | 11/2012 | Ko et al. |
| 8,370,678 B2 | 2/2013 | Millington et al. |
| 8,423,659 B2 | 4/2013 | Millington |
| 8,483,853 B1 | 7/2013 | Lambourne |
| 8,521,316 B2 | 8/2013 | Louboutin |
| 8,588,949 B2 | 11/2013 | Lambourne et al. |
| 8,613,385 B1 | 12/2013 | Hulet et al. |
| 8,666,826 B2 | 3/2014 | Narayanan et al. |
| 8,775,546 B2 | 7/2014 | Millington |
| 8,843,500 B2 | 9/2014 | Nogues et al. |
| 8,892,648 B1 | 11/2014 | Durham et al. |
| 8,910,265 B2 | 12/2014 | Lang et al. |
| 8,942,252 B2 | 1/2015 | Balassanian et al. |
| 8,990,701 B2 | 3/2015 | Olofsson |
| 9,052,810 B2 | 6/2015 | Reimann et al. |
| 9,137,564 B2 | 9/2015 | Reimann |
| 9,165,255 B1 | 10/2015 | Shetty et al. |
| 9,246,866 B1 | 1/2016 | Sanders |
| 9,247,363 B2 | 1/2016 | Triplett et al. |
| 9,286,384 B2 | 3/2016 | Kuper et al. |
| 9,344,292 B2 | 5/2016 | Griffiths et al. |
| 9,374,607 B2 | 6/2016 | Bates et al. |
| 9,478,247 B2 | 10/2016 | Chen |
| 9,489,383 B2 | 11/2016 | Hyman et al. |
| 9,510,055 B2 | 11/2016 | Kuper et al. |
| 9,524,338 B2 | 12/2016 | Van Der Heide |
| 9,696,874 B2 | 7/2017 | Kulick et al. |
| 9,715,500 B2 | 7/2017 | Cue et al. |
| 9,756,092 B2 | 9/2017 | Zhang et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0054134 A1 | 5/2002 | Kelts |
| 2002/0056117 A1 | 5/2002 | Hasegawa et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0116476 A1 | 8/2002 | Eyal et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassetti et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0099212 A1 | 5/2003 | Anjum et al. |
| 2003/0099221 A1 | 5/2003 | Rhee |
| 2003/0105820 A1 | 6/2003 | Haims et al. |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0220973 A1 | 11/2003 | Zhu et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0108320 A1 | 5/2005 | Lord et al. |
| 2005/0114538 A1 | 5/2005 | Rose |
| 2005/0125357 A1 | 6/2005 | Saadat et al. |
| 2005/0166157 A1 | 7/2005 | Ollis et al. |
| 2005/0177643 A1 | 8/2005 | Xu |
| 2005/0181348 A1 | 8/2005 | Carey et al. |
| 2005/0195205 A1 | 9/2005 | Abrams, Jr. |
| 2005/0201254 A1 | 9/2005 | Looney et al. |
| 2005/0234875 A1 | 10/2005 | Auerbach et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0095516 A1 | 5/2006 | Wijeratne |
| 2006/0107237 A1 | 5/2006 | Kim |
| 2006/0119497 A1 | 6/2006 | Miller et al. |
| 2006/0143236 A1 | 6/2006 | Wu |
| 2006/0168340 A1 | 7/2006 | Heller et al. |
| 2006/0195462 A1 | 8/2006 | Rogers |
| 2006/0195479 A1 | 8/2006 | Spiegelman et al. |
| 2006/0195480 A1 | 8/2006 | Spiegelman et al. |
| 2006/0253436 A1 | 11/2006 | Cook et al. |
| 2006/0253782 A1 | 11/2006 | Stark et al. |
| 2006/0294074 A1 | 12/2006 | Chang |
| 2007/0033402 A1 | 2/2007 | Williams et al. |
| 2007/0038999 A1 | 2/2007 | Millington et al. |
| 2007/0043847 A1 | 2/2007 | Carter et al. |
| 2007/0048713 A1 | 3/2007 | Plastina et al. |
| 2007/0054680 A1 | 3/2007 | Mo et al. |
| 2007/0088747 A1 | 4/2007 | Cheng et al. |
| 2007/0136778 A1 | 6/2007 | Birger et al. |
| 2007/0142022 A1 | 6/2007 | Madonna et al. |
| 2007/0142944 A1 | 6/2007 | Goldberg et al. |

(56) References Cited

U.S. PATENT DOCUMENTS

| | | |
|---|---|---|
| 2007/0143493 A1 | 6/2007 | Mullig et al. |
| 2007/0169115 A1 | 7/2007 | Ko et al. |
| 2007/0180137 A1 | 8/2007 | Rajapakse |
| 2007/0214182 A1 | 9/2007 | Rosenberg |
| 2007/0224937 A1 | 9/2007 | Jung et al. |
| 2007/0271232 A1 | 11/2007 | Mattox et al. |
| 2007/0271388 A1 | 11/2007 | Bowra et al. |
| 2007/0288470 A1 | 12/2007 | Kauniskangas et al. |
| 2007/0294131 A1 | 12/2007 | Roman et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0052371 A1 | 2/2008 | Partovi et al. |
| 2008/0059510 A1 | 3/2008 | Cardamore et al. |
| 2008/0077261 A1 | 3/2008 | Baudino et al. |
| 2008/0086368 A1 | 4/2008 | Bauman et al. |
| 2008/0091771 A1 | 4/2008 | Allen et al. |
| 2008/0109529 A1 | 5/2008 | Story |
| 2008/0120429 A1 | 5/2008 | Millington et al. |
| 2008/0144861 A1 | 6/2008 | Melanson et al. |
| 2008/0152165 A1 | 6/2008 | Zacchi |
| 2008/0154959 A1 | 6/2008 | Dunko |
| 2008/0194276 A1 | 8/2008 | Lin et al. |
| 2008/0301280 A1 | 12/2008 | Chasen et al. |
| 2008/0319833 A1 | 12/2008 | Svendsen |
| 2009/0031336 A1 | 1/2009 | Chavez et al. |
| 2009/0041423 A1 | 2/2009 | Weber et al. |
| 2009/0063414 A1 | 3/2009 | White et al. |
| 2009/0076881 A1 | 3/2009 | Svendsen |
| 2009/0150806 A1 | 6/2009 | Evje et al. |
| 2009/0157905 A1 | 6/2009 | Davis |
| 2009/0179867 A1 | 7/2009 | Shim et al. |
| 2009/0222115 A1 | 9/2009 | Malcolm et al. |
| 2009/0228919 A1 | 9/2009 | Zott et al. |
| 2009/0249222 A1 | 10/2009 | Schmidt et al. |
| 2009/0265426 A1 | 10/2009 | Svendsen et al. |
| 2009/0307062 A1 | 12/2009 | Lutnick et al. |
| 2009/0313369 A1 | 12/2009 | Wormington et al. |
| 2010/0010648 A1 | 1/2010 | Bull et al. |
| 2010/0017366 A1 | 1/2010 | Robertson et al. |
| 2010/0017714 A1 | 1/2010 | Agarwal et al. |
| 2010/0031366 A1 | 2/2010 | Knight et al. |
| 2010/0036950 A1 | 2/2010 | Bae et al. |
| 2010/0049835 A1 | 2/2010 | Ko et al. |
| 2010/0054275 A1 | 3/2010 | Noonan et al. |
| 2010/0082731 A1 | 4/2010 | Haughay et al. |
| 2010/0094834 A1 | 4/2010 | Svendsen |
| 2010/0095332 A1 | 4/2010 | Gran et al. |
| 2010/0131567 A1 | 5/2010 | Dorogusker et al. |
| 2010/0205222 A1 | 8/2010 | Gajdos et al. |
| 2010/0228740 A1 | 9/2010 | Cannistraro et al. |
| 2010/0262909 A1 | 10/2010 | Hsieh |
| 2010/0284389 A1 | 11/2010 | Ramsay et al. |
| 2010/0299391 A1 | 11/2010 | Demarta et al. |
| 2010/0299639 A1 | 11/2010 | Ramsay et al. |
| 2010/0318917 A1 | 12/2010 | Holladay et al. |
| 2011/0004330 A1 | 1/2011 | Rothkopf et al. |
| 2011/0066943 A1 | 3/2011 | Brillon et al. |
| 2011/0087842 A1 | 4/2011 | Lu et al. |
| 2011/0119706 A1 | 5/2011 | Scott et al. |
| 2011/0154173 A1 | 6/2011 | Herlein |
| 2011/0196888 A1 | 8/2011 | Hanson et al. |
| 2011/0202430 A1 | 8/2011 | Narayanan et al. |
| 2011/0202842 A1 | 8/2011 | Weatherly et al. |
| 2011/0211534 A1 | 9/2011 | Schmidt et al. |
| 2011/0225417 A1 | 9/2011 | Maharajh et al. |
| 2011/0238755 A1 | 9/2011 | Khan et al. |
| 2011/0246383 A1 | 10/2011 | Gibson et al. |
| 2011/0264732 A1 | 10/2011 | Robbin et al. |
| 2011/0314388 A1 | 12/2011 | Wheatley |
| 2012/0029671 A1 | 2/2012 | Millington et al. |
| 2012/0030366 A1 | 2/2012 | Collart et al. |
| 2012/0054278 A1 | 3/2012 | Taleb et al. |
| 2012/0060046 A1 | 3/2012 | Millington |
| 2012/0071996 A1 | 3/2012 | Svendsen |
| 2012/0096526 A1 | 4/2012 | Brahmanapalli et al. |
| 2012/0117168 A1 | 5/2012 | Sugiyama et al. |
| 2012/0117185 A1 | 5/2012 | Cassidy |
| 2012/0117586 A1 | 5/2012 | McCoy et al. |
| 2012/0129446 A1 | 5/2012 | Ko et al. |
| 2012/0151320 A1 | 6/2012 | McClements, IV |
| 2012/0158531 A1 | 6/2012 | Dion et al. |
| 2012/0159393 A1 | 6/2012 | Sethi et al. |
| 2012/0206623 A1 | 8/2012 | Nakama |
| 2012/0210205 A1 | 8/2012 | Sherwood et al. |
| 2012/0221951 A1 | 8/2012 | Kidron |
| 2012/0233067 A1 | 9/2012 | Matthew et al. |
| 2012/0233639 A1 | 9/2012 | Zott et al. |
| 2012/0272156 A1 | 10/2012 | Kerger et al. |
| 2012/0284423 A1 | 11/2012 | Weel |
| 2012/0311635 A1 | 12/2012 | Mushkatblat |
| 2012/0315884 A1 | 12/2012 | Forutanpour et al. |
| 2012/0331386 A1 | 12/2012 | Hicken et al. |
| 2013/0007617 A1 | 1/2013 | MacKenzie et al. |
| 2013/0024880 A1 | 1/2013 | Moloney-Egnatios et al. |
| 2013/0031162 A1 | 1/2013 | Willis et al. |
| 2013/0061296 A1 | 3/2013 | Reddy et al. |
| 2013/0070093 A1 | 3/2013 | Rivera et al. |
| 2013/0073584 A1 | 3/2013 | Kuper et al. |
| 2013/0080599 A1 | 3/2013 | Ko et al. |
| 2013/0080955 A1 | 3/2013 | Reimann et al. |
| 2013/0094670 A1 | 4/2013 | Millington |
| 2013/0128038 A1 | 5/2013 | Cok et al. |
| 2013/0129232 A1 | 5/2013 | Cok et al. |
| 2013/0130729 A1 | 5/2013 | Cok et al. |
| 2013/0159858 A1 | 6/2013 | Joffray et al. |
| 2013/0173034 A1 | 7/2013 | Reimann et al. |
| 2013/0174204 A1 | 7/2013 | Coburn, IV et al. |
| 2013/0191454 A1 | 7/2013 | Oliver et al. |
| 2013/0191749 A1 | 7/2013 | Coburn, IV et al. |
| 2013/0198633 A1 | 8/2013 | Hyman |
| 2013/0246522 A1 | 9/2013 | Bilinski et al. |
| 2013/0246916 A1 | 9/2013 | Reimann et al. |
| 2013/0254207 A1 | 9/2013 | Coburn, IV et al. |
| 2013/0254663 A1 | 9/2013 | Bates et al. |
| 2013/0310316 A1 | 11/2013 | Hellstrom et al. |
| 2013/0339397 A1 | 12/2013 | Herasymchuk |
| 2013/0343567 A1 | 12/2013 | Triplett et al. |
| 2013/0346859 A1 | 12/2013 | Bates et al. |
| 2014/0047074 A1 | 2/2014 | Chung et al. |
| 2014/0052770 A1 | 2/2014 | Gran et al. |
| 2014/0075308 A1 | 3/2014 | Sanders et al. |
| 2014/0075316 A1 | 3/2014 | Li |
| 2014/0081796 A1 | 3/2014 | Cohen |
| 2014/0093219 A1 | 4/2014 | Trivedi |
| 2014/0115061 A1 | 4/2014 | Reddy et al. |
| 2014/0122590 A1 | 5/2014 | Svendsen |
| 2014/0181655 A1 | 6/2014 | Kumar et al. |
| 2014/0201197 A1 | 7/2014 | Kumar et al. |
| 2014/0204076 A1 | 7/2014 | Kuper et al. |
| 2014/0208205 A1 | 7/2014 | Bartholomew |
| 2014/0223099 A1 | 8/2014 | Kidron |
| 2014/0237361 A1 | 8/2014 | Martin et al. |
| 2014/0244863 A1 | 8/2014 | Bradley et al. |
| 2014/0310058 A1 | 10/2014 | Aral et al. |
| 2014/0310779 A1 | 10/2014 | Lof et al. |
| 2014/0330951 A1 | 11/2014 | Sukoff et al. |
| 2014/0337959 A1 | 11/2014 | Garmark et al. |
| 2014/0341528 A1 | 11/2014 | Mahate et al. |
| 2015/0046458 A1 | 2/2015 | Hu |
| 2015/0067054 A1 | 3/2015 | Yoo et al. |
| 2015/0067871 A1 | 3/2015 | Commons et al. |
| 2015/0074534 A1 | 3/2015 | Didomenico et al. |
| 2015/0095170 A1 | 4/2015 | Lang et al. |
| 2015/0095680 A1 | 4/2015 | Gossain et al. |
| 2015/0128162 A1 | 5/2015 | Ionescu et al. |
| 2015/0185599 A1 | 7/2015 | Mullins |
| 2015/0186110 A1 | 7/2015 | Kannan |
| 2015/0220498 A1 | 8/2015 | Munoz et al. |
| 2015/0286360 A1 | 10/2015 | Wachter |
| 2015/0310009 A1 | 10/2015 | Van Der Heide |
| 2015/0312299 A1 | 10/2015 | Chen |
| 2016/0063011 A1 | 3/2016 | Wehbi et al. |

(56) References Cited

U.S. PATENT DOCUMENTS

| | | | |
|---|---|---|---|
| 2016/0082348 | A1 | 3/2016 | Kehoe et al. |
| 2016/0180248 | A1 | 6/2016 | Regan |
| 2017/0169522 | A1 | 6/2017 | Hyman et al. |

FOREIGN PATENT DOCUMENTS

| | | | |
|---|---|---|---|
| EP | 0672985 | A1 | 9/1995 |
| EP | 1111527 | A2 | 6/2001 |
| EP | 1389853 | A1 | 2/2004 |
| JP | 2007520808 | A | 7/2007 |
| JP | 2009540638 | A | 11/2009 |
| JP | 2011128957 | | 6/2011 |
| JP | 2011223124 | A | 11/2011 |
| KR | 20010090215 | | 10/2001 |
| KR | 20050051785 | | 6/2005 |
| KR | 1020070040592 | | 4/2007 |
| KR | 20070048922 | | 5/2007 |
| KR | 100890993 | | 3/2009 |
| KR | 20100060498 | A | 6/2010 |
| KR | 20100071724 | | 6/2010 |
| KR | 20100134164 | | 12/2010 |
| KR | 20110064635 | | 6/2011 |
| KR | 20130083012 | A | 7/2013 |
| WO | 199525313 | | 9/1995 |
| WO | 199961985 | | 12/1999 |
| WO | 200147248 | | 6/2001 |
| WO | 200153994 | | 7/2001 |
| WO | 02052540 | A1 | 7/2002 |
| WO | 2002052540 | | 7/2002 |
| WO | 2003093950 | A2 | 11/2003 |
| WO | 2005013047 | A2 | 2/2005 |
| WO | 2005079071 | A1 | 8/2005 |
| WO | 2007023120 | A1 | 3/2007 |
| WO | 2010018429 | A1 | 2/2010 |
| WO | 2011100264 | A3 | 11/2011 |
| WO | 2011157891 | A1 | 12/2011 |
| WO | 2012056326 | A2 | 5/2012 |
| WO | 2012106269 | | 8/2012 |
| WO | 2013139239 | A1 | 9/2013 |
| WO | 2014004181 | | 1/2014 |
| WO | 2014116693 | A1 | 7/2014 |
| WO | 2014145746 | | 9/2014 |

OTHER PUBLICATIONS

Non-Final Office Action dated Jan. 12, 2017, issued in connection with U.S. Appl. No. 14/275,112, filed May 12, 2014, 25 pages.
Non-Final Office Action dated Dec. 17, 2015, issued in connection with U.S. Appl. No. 14/173,253, filed Feb. 5, 2014, 18 pages.
Non-Final Office Action dated Jun. 17, 2016, issued in connection with U.S. Appl. No. 14/495,706, filed Sep. 24, 2014, 19 pages.
Non-Final Office Action dated May 18, 2016, issued in connection with U.S. Appl. No. 14/197,403, filed Mar. 5, 2014, 21 pages.
North American MPEG-2 Information, "The MPEG-2 Transport Stream," Retrieved from the Internet:, 2006, pp. 1-5.
Notice of Allowance dated Jan. 12, 2017, issued in connection with U.S. Appl. No. 14/495,595, filed Sep. 24, 2014, 5 pages.
Notice of Allowance dated Dec. 29, 2016, issued in connection with U.S. Appl. No. 14/197,403, filed Mar. 5, 2014, 5 pages.
Park et al., "Group Synchronization in MultiCast Media Communications," Proceedings of the 5th Research on Multicast Technology Workshop, 2003, 5 pages.
Polycom Conference Composer User Guide, copyright 2001, 29 pages.
Preinterview First Office Action dated May 4, 2016, issued in connection with U.S. Appl. No. 14/495,659, filed Sep. 24, 2014, 6 pages.
Preinterview First Office Action dated May 4, 2016, issued in connection with U.S. Appl. No. 14/455,651, filed Aug. 8, 2014, 7 pages.
Preinterview First Office Action dated May 5, 2016, issued in connection with U.S. Appl. No. 14/495,595, filed Sep. 24, 2014, 6 pages.
Preinterview First Office Action dated May 16, 2016, issued in connection with U.S. Appl. No. 14/495,633, filed Sep. 24, 2014, 6 pages.
Preinterview First Office Action dated Oct. 19, 2016, issued in connection with U.S. Appl. No. 14/821,513, filed Aug. 7, 2016, 5 pages.
Preinterview First Office Action dated May 23, 2016, issued in connection with U.S. Appl. No. 14/495,684, filed Sep. 24, 2014, 6 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
U.S. Appl. No. 12/070,933, filed Feb. 22, 2008. "System, Method, and Computer Program for Remotely Managing a Digital Device" Inventor: Jonathan Lang, et al.
U.S. Appl. No. 13/533,105, filed Jun. 26, 2012. "Systems, Methods, Apparatus, and Articles of Manufacture to Provide a Crowd-Sourced Playlist with Guess Access" Inventor: Paul Bates, et al.
U.S. Appl. No. 13/533,785, filed Jun. 26, 2012. "Networked Music Playback Including Remote Discovery and Add to Queue" Inventor: Mark Triplett, et al.
U.S. Appl. No. 13/748,357, filed Jan. 23, 2011 "System and Method for a Media Experience Social Interface" Inventor: Ron Kuper, et al.
U.S. Appl. No. 13/871,785, filed Apr. 26, 2013. "Systems, Methods, Apparatus, and Articles of Manufacture to Provide Guest Access" Inventor: Paul Bates, et al.
U.S. Appl. No. 13/871,795, filed Jun. 20, 2013. "Systems, Methods, Apparatus, and Articles of Manufacture to Provide Guest Access" Inventor: Paul Bates, et al.
U.S. Appl. No. 14/173,253, filed Feb. 5, 2014. "Remote Creation of a Playback Queue for a Future Event" Inventor: Jaime Munoz, et al.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 32 manual: copyright 2001.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
European Patent Office, European Supplemental Search Report dated Jan. 27, 2016, issued in connection with European Application No. 14743335.3, 8 pages.
International Bureau, International Preliminary Report on Patentability, dated Aug. 6, 2015, issued in connection with International Application No. PCT/US2014/012534, filed on Jan. 22, 2014, 6 pages.
International Searching Authority, International Search Report dated May 7, 2014, issued in connection with International Application No. PCT/US2014/012534, 3 pages.

(56) References Cited

OTHER PUBLICATIONS

Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Oct. 1, 2015, issued in connection with U.S. Appl. No. 13/748,357, filed Jan. 23, 2013, 18 pages.
Non-Final Office Action dated May 6, 2015, issued in connection with U.S. Appl. No. 13/748,357, filed Jan. 23, 2013, 17 pages.
Notice of Allowance dated May 4, 2016, issued in connection with U.S. Appl. No. 13/748,357, filed Jan. 23, 2013, 11 pages.
Palm, Inc., "Handbook for the Palm VII Handheld," May 2000, 311 pages.
Presentations at WinHEC 2000, May 2000, 138 pages.
PRISMIQ; Inc., "PRISMIQ Media Player User Guide", 2003, 44 pages.
UPnP; "Universal Plug and Play Device Architecture," Jun. 8, 2000; version 1.0; Microsoft Corporation; pp. 1-54.
Advisory Action dated Jul. 12, 2016, issued in connection with U.S. Appl. No. 14/173,253, filed Feb. 5, 2014, 5 pages.
Akyildiz et al., "Multimedia Group Synchronization Protocols for Integrated Services Networks," IEEE Journal on Selected Areas in Communications, 1996 pp. 162-173, vol. 14, No. 1.
Benslimane Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International Conference on Multimedia Computing and Systems, 1996, pp. 372-381.
Bretl W.E., et al., MPEG2 Tutorial [online], 2000 [retrieved on Jan. 13, 2009] Retrieved from the Internet:, pp. 1-23.
"Denon 2003-2004 Product Catalog," Denon, 2003-2004, 44 pages.
European Patent Office, Extended European Search Report dated Dec. 23, 2016, issued in connection with European Application No. 15746781.2, 10 pages.
sinal Office Action dated Nov. 3, 2016, issued in connection with U.S. Appl. No. 14/495,684, filed Sep. 24, 2014, 16 pages.
Final Office Action dated Apr. 6, 2016, issued in connection with U.S. Appl. No. 14/173,253, filed Feb. 5, 2014, 20 pages.
Final Office Action dated Oct. 7, 2016, issued in connection with U.S. Appl. No. 14/495,595, filed Sep. 24, 2014, 16 pages.
Final Office Action dated Nov. 8, 2016, issued in connection with U.S. Appl. No. 14/495,659, filed Sep. 24, 2014, 14 pages.
Final Office Action dated Feb. 10, 2016, issued in connection with U.S. Appl. No. 14/197,403, filed Mar. 5, 2014, 21 pages.
Final Office Action dated Sep. 16, 2016, issued in connection with U.S. Appl. No. 14/275,112, filed May 12, 2014, 19 pages.
Final Office Action dated Oct. 20, 2016, issued in connection with U.S. Appl. No. 14/197,403, filed Mar. 5, 2016, 17 pages.
Final Office Action dated Sep. 30, 2016, issued in connection with U.S. Appl. No. 14/297,193, filed Jun. 5, 2014, 34 pages.
First Action Interview Office Action dated Apr. 4, 2016, issued in connection with U.S. Appl. No. 14/275,112, filed May 12, 2014, 8 pages.
First Action Interview Office Action dated Jul. 7, 2016, issued in connection with U.S. Appl. No. 14/495,595, filed Sep. 24, 2014, 6 pages.
First Action Interview Office Action dated Jul. 11, 2016, issued in connection with U.S. Appl. No. 14/495,684, filed Sep. 24, 2014, 8 pages.
First Action Interview Office Action dated Jul. 13, 2016, issued in connection with U.S. Appl. No. 14/455,651, filed Aug. 8, 2014, 10 pages.
First Action Interview Office Action dated Oct. 13, 2016, issued in connection with U.S. Appl. No. 14/495,633, filed Sep. 24, 2014, 8 pages.
First Action Interview Office Action dated Dec. 14, 2016, issued in connection with U.S. Appl. No. 14/821,513, filed Aug. 7, 2015, 10 pages.
First Action Interview Office Action dated Jul. 22, 2016, issued in connection with U.S. Appl. No. 14/495,659, filed Sep. 24, 2014, 8 pages.
First Action Interview Pilot Program Pre-Interview Communication dated Oct. 28, 2015, issued in connection with U.S. Appl. No. 14/275,112, filed May 12, 2014, 4 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Bureau, International Preliminary Report on Patentability dated Jan. 30, 2014, issued in connection with International Application No. PCT/US2012/047620, filed on Jul. 20, 2012, 7 pages.
International Bureau, International Preliminary Report on Patentability dated Apr. 3, 2014, issued in connection with International Application No. PCT/US2012/056467, filed on Sep. 21, 2011, 11 pages.
International Bureau, International Preliminary Report on Patentability dated Dec. 15, 2016, issued in connection with International Application No. PCT/US2015/031934, filed on May 21, 2015, 11 pages.
International Bureau, International Preliminary Report on Patentability dated Aug. 18, 2016, issued in connection with International Application No. PCT/US2015/014156, filed on Feb. 3, 2015, 10 pages.
International Bureau,International Preliminary Report on Patentability dated Sep. 15, 2016, issued in connection with International Application No. PCT/US2015/018850, filed on Mar. 5, 2015, 10 pages.
International Searching Authority, International Search Report and Written Opinion dated Nov. 6, 2015, issued in connection with International Application No. PCT/US2015/051993, filed on Sep. 24, 2015, 10 pages.
International Searching Authority, International Search Report and Written Opinion dated Dec. 7, 2015, issued in connection with International Application No. PCT/US2015/051968, filed on Sep. 24, 2015, 14 pages.
International Searching Authority, International Search Report and Written Opinion dated Dec. 16, 2015, issued in connection with International Application No. PCT/US2015/051989 filed on Sep. 24, 2015, 11 pages.
International Searching Authority, International Search Report and Written Opinion dated Dec. 21, 2015, issued in connection with International Application No. PCT/US2015/051983 filed on Sep. 24, 2015, 11 pages.
International Searching Authority, International Search Report and Written Opinion dated Nov. 23, 2015, issued in connection with International Application No. PCT/US2015/051975, 14 pages.
International Searching Authority, International Search Report and Written Opinion dated Apr. 24, 2015, issued in connection with International Application No. PCT/US2015/014156, filed on Feb. 3, 2015, 13 pages.
International Searching Authority, International Search Report and Written Opinion dated Aug. 27, 2015, issued in connection with International Application No. PCT/US2015/031934, filed on May 21, 2015, 14 pages.
International Searching Authority, International Search Report and Written Opinion dated Nov. 27, 2015, issued in connection with International Application No. PCT/US2015/044218, filed on Aug. 7, 2015, 13 pages.
International Searching Authority, International Search Report and Written Opinion dated May 29, 2015, issued in connection with International Application No. PCT/US2015/018850, filed on Mar. 5, 2015, 13 pages.
International Searching Authority, International Search Report dated Dec. 27, 2012, issued in connection with International Application No. PCT/US2012/047620, filed on Jul. 20, 2011, 3 pages.

(56) References Cited

OTHER PUBLICATIONS

International Searching Authority, Written Opinion dated Dec. 27, 2012, issued in connection with International Application No. PCT/US2012/047620, filed on Jul. 20, 2011, 5 pages.
International Searhing Authority, International Search Report and Written Opinion dated Feb. 28, 2013, issued in connection with International Application No. PCT/US2012/056467, filed on Sep. 21, 2012, 12 pages.
Ishibashi et al., "A Group Synchronization Mechanism for Live Media in Multicast Communications," IEEE Global Telecommunications Conference, 1997, pp. 746-752, vol. 2.
Ishibashi et al., "A Group Synchronization Mechanism for Stored Media in Multicast Communications," IEEE Information Revolution and Communications, 1997, pp. 692-700, vol. 2.
Japanese Patent Office, Notice of Rejection dated Nov. 8, 2016, issued in connection with Japanese Application No. 2015-555237, 6 pages.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer communication Review, 1994, pp. 28-43, vol. 24, No. 2.
Motorola, "Simplefi, Wireless Digital Audio Receiver, Installation and User Guide," Dec. 31, 2001, 111 pages.
Nilsson, M., "ID3 Tag Version 2," Mar. 26, 1998, 28 pages.
Non-Final Office Action dated Nov. 1, 2016, issued in connection with U.S. Appl. No. 14/173,253, filed Feb. 5, 2014, 21 pages.
Non-Final Office Action dated Apr. 6, 2016, issued in connection with U.S. Appl. No. 14/297,193, filed Jun. 5, 2014, 26 pages.
Advisory Action dated Feb. 1, 2017, issued in connection with U.S. Appl. No. 14/297,193, filed Jun. 5, 2014, 6 pages.
Advisory Action dated Feb. 3, 2017, issued in connection with U.S. Appl. No. 14/495,659, filed Sep. 24, 2014, 5 pages.
Advisory Action dated Aug. 22, 2017, issued in connection with U.S. Appl. No. 14/173,253, filed Feb. 5, 2014, 4 pages.
Chinese Patent Office, First Office Action dated Sep. 4, 2017, issued in connection with Chinese Application No. 2014800172148.0, 16 pages.
Chinese Patent Office, Second Office Action dated Apr. 11, 2018, issued in connection with Chinese Application No. 201480017214.8, 7 pages.
Corrected Notice of Allowability dated Jan. 19, 2017, issued in connection with U.S. Appl. No. 14/197403, filed Mar. 5, 2014, 2 pages.
European Patent Office, EP Supplemental Search dated Dec. 19, 2017, issued in connection with EP Application No. 15829058.5, 12 pages.
European Patent Office, European Extended Search Report dated Feb. 5, 2018, issued in connection with EP Application No. 15803430.6, 8 pages.
European Patent Office, European Office Action dated Aug. 3, 2017, issued in connection with EP Application No. 15781794.1, 6 pages.
European Patent Office, European Supplemental Search Report dated Sep. 18, 2017, issued in connection with EP Application No. 15829058.5, 13 pages.
European Patent Office, Examination Report dated Feb. 3, 2017, issued in connection with European Patent Application No. 14743335.3, 5 pages.
European Patent Office, Extended European Search Report dated Mar. 15, 2017, issued in connection with European Application No. 15758460.8, 9 pages.
European Patent Office, Office Action dated Mar. 2, 2017, issued in connection with European Application No. 15775566.1, 7 pages.
European Patent Office, Office Action dated Apr. 4, 2017, issued in connection with European Application No. 15775897.0, 6 pages.
European Patent Office, Office Action dated Jan. 13, 2017, issued in connection with European Application No. 15781794.1, 8 pages.
European Patent Office, Office Action dated Mar. 13, 2017, issued in connection with European Application No. 15781200.9, 5 pages.
European Patent Office, Summons to Attend Oral Proceedings dated Mar. 27, 2018, issued in connection with European Patent Application No. 15781794.1, 11 pages.
Final Office Action dated Nov. 2, 2017, issued in connection with U.S. Appl. No. 14/275,112, filed May 12, 2014, 20 pages.
Final Office Action dated Feb. 7, 2017, issued in connection with U.S. Appl. No. 14/455,651, filed Aug. 8, 2014, 22 pages.
Final Office Action dated Feb. 16, 2017, issued in connection with U.S. Appl. No. 14/495,633, filed Sep. 24, 2014, 15 pages.
Final Office Action dated Jan. 19, 2018, issued in connection with U.S. Appl. No. 14/297,193, filed Jun. 5, 2014, 32 pages.
Final Office Action dated Mar. 28, 2018, issued in connection with U.S. Appl. No. 14/495,633, filed Sep. 24, 2014, 21 pages.
Final Office Action dated May 31, 2017, issued in connection with U.S. Appl. No. 14/173,253, filed Feb. 5, 2014, 22 pages.
Final Office Action dated May 31, 2017, issued in connection with U.S. Appl. No. 14/821,513, filed Aug. 7, 2015, 16 pages.
First Action Interview Pilot Program Pre-Interview Communication dated Apr. 3, 2017, issued in connection with U.S. Appl. No. 14/495,590, filed Sep. 24, 2014, 5 pages.
International Searching Authority, International Preliminary Report on Patentability dated Apr. 6, 2017, issued in connection with International Application No. PCT/US2015/051968 filed on Sep. 24, 2015, 10 pages.
International Searching Authority, International Preliminary Report on Patentability dated Apr. 6, 2017, issued in connection with International Application No. PCT/US2015/051975 filed on Sep. 24, 2015, 9 pages.
International Searching Authority, International Preliminary Report on Patentability dated Apr. 6, 2017, issued in connection with International Application No. PCT/US2015/051983 filed on Sep. 24, 2015, 7 pages.
International Searching Authority, International Preliminary Report on Patentability dated Apr. 6, 2017, issued in connection with International Application No. PCT/US2015/051989 filed on Sep. 24, 2015, 7 pages.
International Searching Authority, International Preliminary Report on Patentability dated Apr. 6, 2017, issued in connection with International Application No. PCT/US2015/051993 filed on Sep. 24, 2015, 8 pages.
International Searching Authority, International Preliminary Report on Patentability dated Feb. 23, 2017, issued in connection with International Application No. PCT/US2015/044218, filed on Aug. 7, 2015, 10 pages.
Japanese Patent Office, Full English Translation of Office Action dated Nov. 28, 2017, issued in connection with Japanese Patent Application No. 2016-555529, 2 pages.
Japanese Patent Office, Office Action dated Nov. 28, 2017, issued in connection with Japanese Patent Application No. 2016-555529, 5 pages.
Japanese Patent Office, Office Action dated Nov. 7, 2017, issued in connection with Japanese Patent Application No. 2016-550231, 5 pages.
Non-Final Office Action dated Oct. 3, 2017, issued in connection with U.S. Appl. No. 14/495,633, filed Sep. 24, 2014, 18 pages.
Non-Final Office Action dated Jul. 10, 2017, issued in connection with U.S. Appl. No. 14/297,193, filed Jun. 5, 2014, 33 pages.
Non-Final Office Action dated Jun. 14, 2017, issued in connection with U.S. Appl. No. 14/495,659, filed Sep. 24, 2014, 15 pages.
Non-Final Office Action dated Jun. 21, 2018, issued in connection with U.S. Appl. No. 15/692,090, filed Aug. 31, 2017, 20 pages.
Non-Final Office Action dated Jan. 24, 2018, issued in connection with U.S. Appl. No. 15/607,267, filed May 26, 2017, 17 pages.
Non-Final Office Action dated Nov. 28, 2017, issued in connection with U.S. Appl. No. 14/821,513, filed Aug. 7, 2015, 17 pages.
Notice of Allowance dated Apr. 6, 2017, issued in connection with U.S. Appl. No. 14/197,403, filed Mar. 5, 2014, 5 pages.
Notice of Allowance dated Sep. 19, 2017, issued in connection with U.S. Appl. No. 14/455,651, filed Aug. 8, 2014, 12 pages.
Notice of Allowance dated Aug. 24, 2017, issued in connection with U.S. Appl. No. 14/495,590, filed Sep. 24, 2014, 10 pages.
Notice of Allowance dated Jan. 26, 2017, issued in connection with U.S. Appl. No. 14/495,706, filed Sep. 24, 2014, 8 pages.

(56) References Cited

OTHER PUBLICATIONS

Notice of Allowance dated Dec. 27, 2017, issued in connection with U.S. Appl. No. 14/495,659, filed Sep. 24, 2014, 6 pages.
Notice of Allowance dated May 31, 2017, issued in connection with U.S. Appl. No. 14/495,684, filed Sep. 24, 2014, 5 pages.
Notice of Allowance dated May 4, 2017, issued in connection with U.S. Appl. No. 14/495,595, filed Sep. 24, 2014, 5 pages.

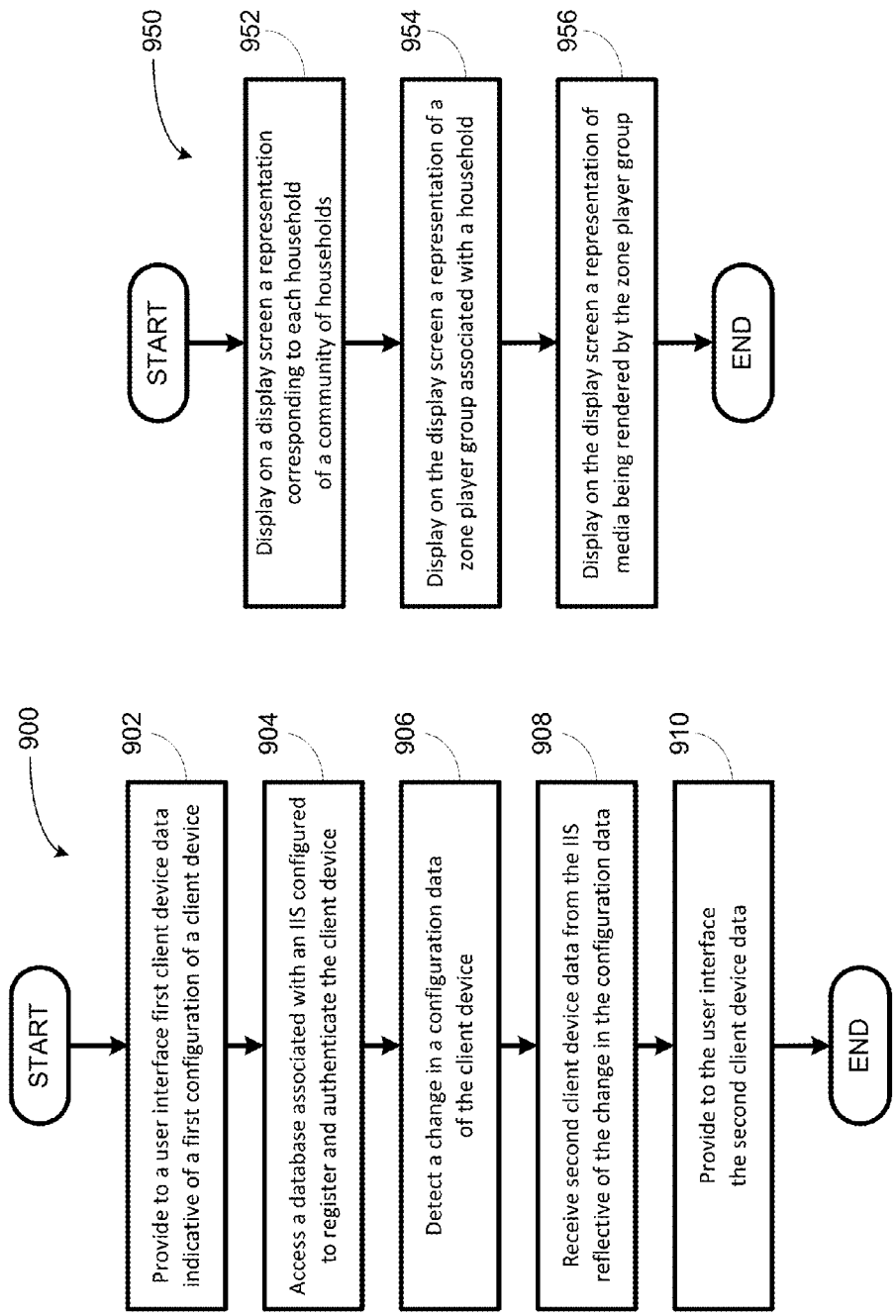

MEDIA EXPERIENCE SOCIAL INTERFACE

CROSS REFERENCE TO RELATED APPLICATIONS

This application claims priority under 35 U.S.C. § 120 to, and is a continuation of, U.S. non-provisional patent application Ser. No. 13/748,357, filed on Jan. 23, 2013, entitled "System and Method for a Media Experience Social Interface," which is incorporated herein by reference in its entirety.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology may be better understood with regard to the following description, appended claims, and accompanying drawings where:

FIG. 9A shows an example flow diagram for updating a media experience social interface;

FIG. 9B shows an example flow diagram for providing a media experience social interface;

Figure 1:
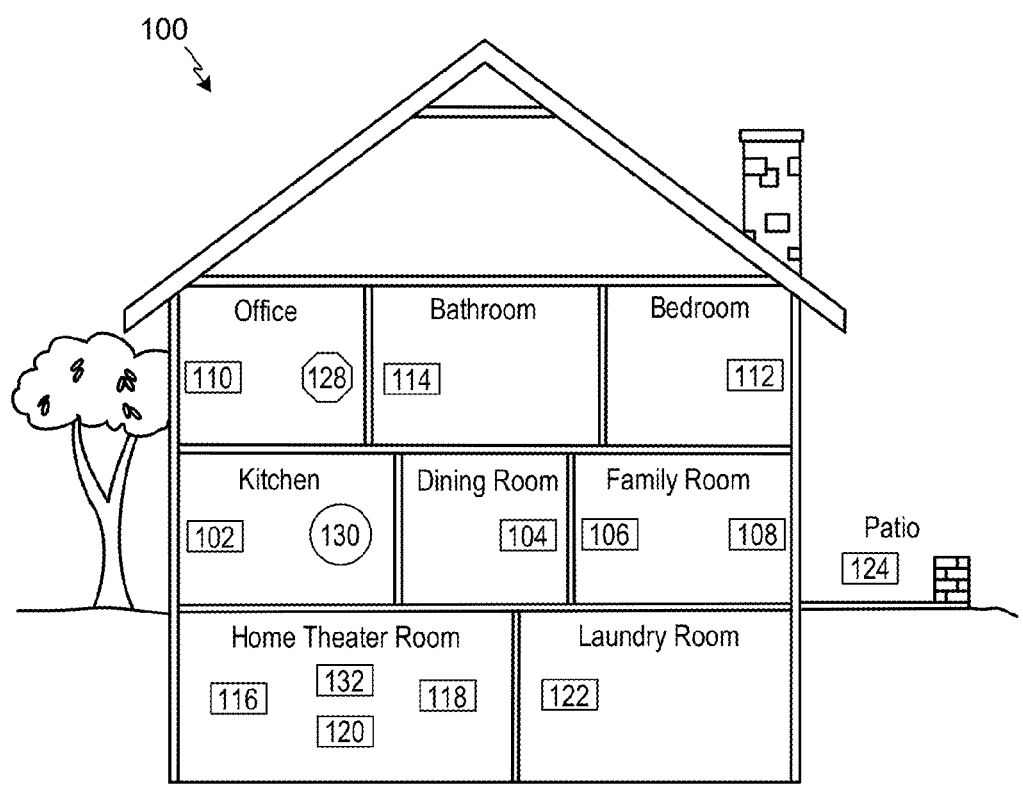
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein include systems and methods, among numerous other inventions, for providing a social interface for sharing media experience information between a community of households. In the following description, a household may refer to any particular location having a media system through which people at the location may experience media. By way of illustration, a location might include a residential unit, a commercial or retail business, an office, a hotel, a boat, a vehicle, an outside location such as a park, and so on. A group of different households (e.g., households of family, friends, and/or acquaintances) may form a community. In this case, the system of each household in the community may share information with one another, via the Internet, for example. In some embodiments, the system of each household in the community communicates with one another. In other embodiments, the system of each household in the community communicates with a central server or database. In one example, the social interface may display a list of households in the community, and a user of the social interface may then select a household from the list to, among other actions, view information on media being experienced within a particular household in the community.

In some cases, a particular household in the community may include separate groups (or zones) of media players configured to render media in synchrony. As such, the social interface may display, upon selection of the particular household, a list of the groups of media players included in the selected household. In this case, the user may then select a group from the list of groups to view information on media being rendered by the media players in the selected group. In addition to information on media being rendered by the selected group, the social interface may also provide information on other media accessible by the selected group, such as a playlist or music library associated with the selected group.

In some cases, if a user is interested in the media being experienced at another household in the community, the user may retrieve a copy of the information to view locally. For instance, if a person at the community household is enjoying a music playlist of interest to the user, the user's own household system may retrieve a copy of the playlist. In one instance, the copy of the playlist may strictly be a listing of media, and may not necessarily include access to media in the playlist.

In another case, the user may also choose to experience locally the same media being experienced by another household in the community. For instance, if the user retrieved a copy of the music playlist enjoyed by a friend in the friend's household, the user may play locally in the user's household, from the music playlist, media the user has access rights to. The user may access the media from the user's account of the same service used by the friend, a different media service, or via a local library of media. Metadata or another form of identification may be used to identify and locate the media for play back.

In yet another case, the user may choose to experience locally the same media being experienced in another household by selecting a zone or zone group of the other household to play the same media. As such, a player or group of players in the local household may be directed over the Internet to a player or group of players in the other household to retrieve and play the media. In one example, the user may experience the media via the access rights of the other household. For instance, a player in the local household may be given a URL that addresses an appropriate device or player in the other household. In another example, the user may experience the media via the access rights of the user in cases where the access rights of the user enable the user to obtain the same or substantially similar media as the other household.

In a further case, the user may control the media experienced by another household of the community. In some embodiments this calls for the other household to have given control access to the user. For instance, a friend may ask the user to introduce him/her to new music, and may provide control access rights to the user. In this instance, the user may, via the user's social interface, browse music accessible by the friend and pick out music to be rendered in the friend's household for the friend to experience. In another instance, the friend may ask the user to put together or "DJ" a playlist of songs for a gathering later in the friend's household. In this instance, the friend may provide control access rights to the user, and the user may, via the social interface, generate a playlist from media accessible by the friend, to be rendered in the friend's household.

In one example, the social interface discussed above may be provided to the user on a personal device of the user. The personal device may be a mobile media player such as an APPLE IPOD®, or a smart phone such as an APPLE IPHONE® or any ANDROID™ powered phone that may be configured to be in communication with the media systems and households in the community. In this example, the social interface may be in the form of a software application on the personal device. In another example, the social interface may be provided on a controller of one or more media systems in a household. In this example, the controller may also be in the form of an application on the personal device. In some cases, the social interface may be included with the controller application.

In yet another example, the social interface may be provided on a website on the World Wide Web accessible over the Internet, or via a "cloud" computing service. In this example, the user may log on to a website (via a web browser on a computer or web browsing application on a personal device) to access the social interface to view information on media experiences, retrieve the media experience information, and/or control the media experiences of the friend.

As discussed above, systems and methods, among other inventions, for sharing media experience information among households are provided herein. In particular, a social interface for displaying the media experience information is discussed. In one aspect, a method for displaying media information for a household of a community of households on a display screen is provided. The method involves displaying on a display screen a representation of a zone player group associated with a household responsive to receipt of a command to select the household from a community of households, and displaying on the display screen a representation of media being rendered by the zone player group, wherein the representation of the media indicates information associated with the media being rendered.

In another aspect, a non-transitory computer readable medium is provided. The non-transitory computer readable medium has stored thereon instructions executable by a computing device to cause the computing device to perform functions. The functions include displaying on a display screen a representation of a zone player group associated with a household responsive to receipt of a command to select the household from a community of households, and displaying on the display screen a representation of media being rendered by the zone player group, wherein the representation of the media indicates information associated with the media being rendered.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 represents a home (or household, as mentioned above) with multiple zones (or groups, as mentioned above), though the household could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the media system configuration 100. Controller 130 may be fixed to a zone, or alternatively, mobile such that it can be moved about the zones. The media system configuration 100 may also include more than one controller 130. The media system configuration 100 illustrates an example whole house media system, though it is understood that the technology described herein is not limited to its particular place of application or to an expansive system like a whole house media system 100 of FIG. 1.

a. Example Zone Players

Figure 2A:
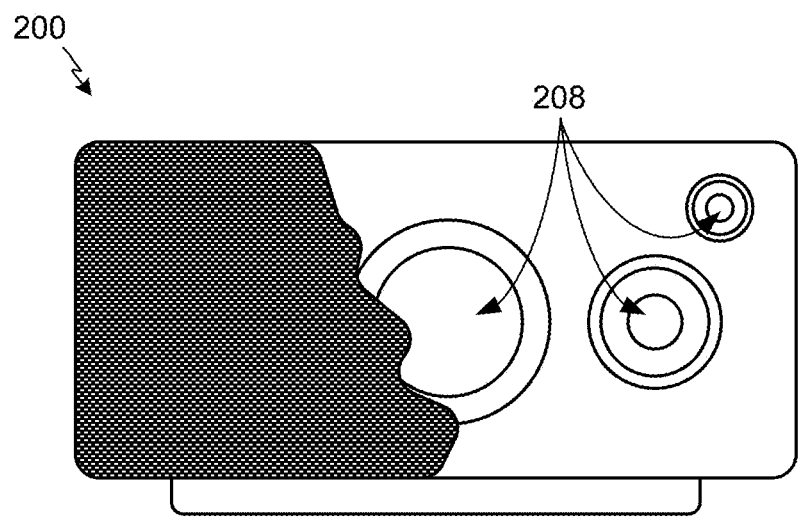
FIG. 2A shows an illustration of an example zone player having a built-in amplifier and transducers.
Figure 2B:
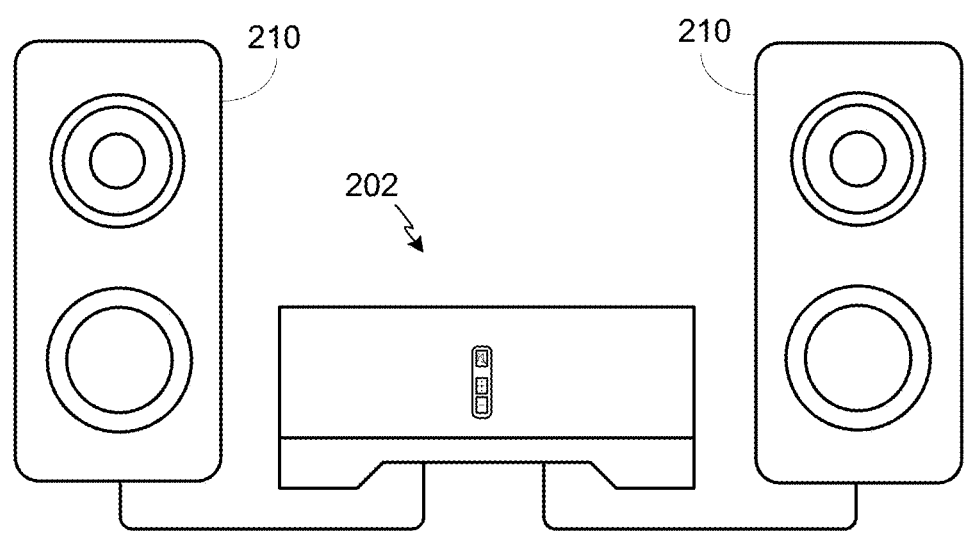
FIG. 2B shows an illustration of an example zone player having a built-in amplifier and connected to external speakers.
Figure 2C:
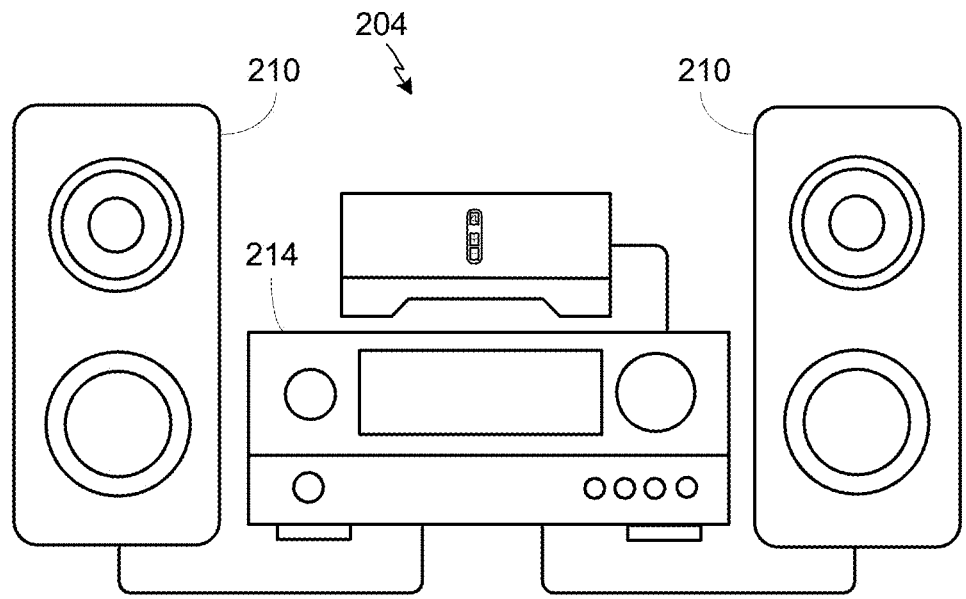
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
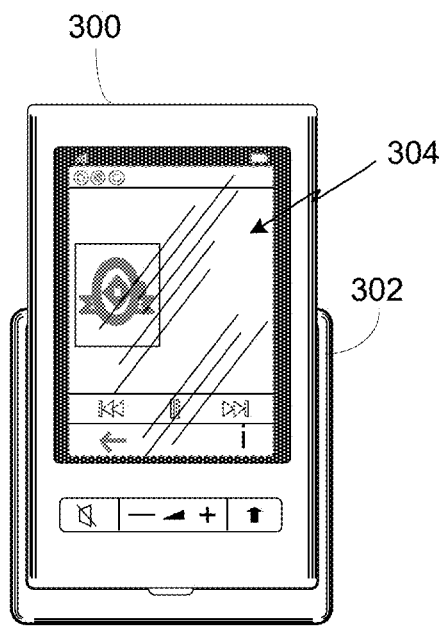
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided, may be used to charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100, each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
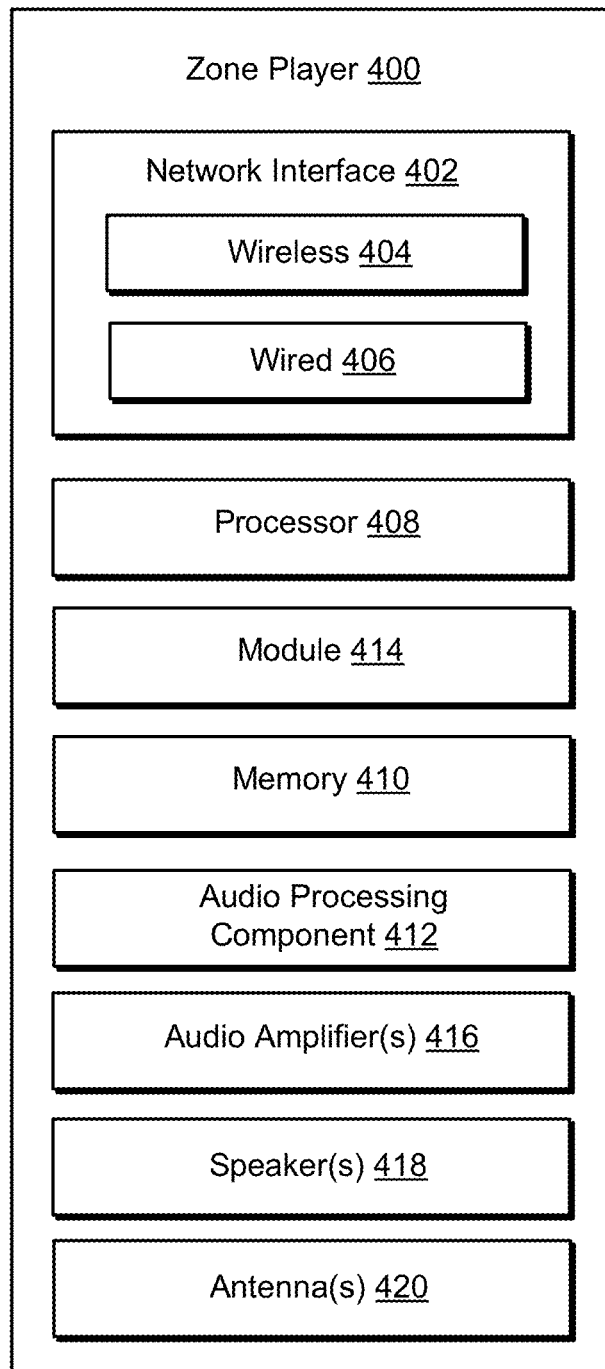
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
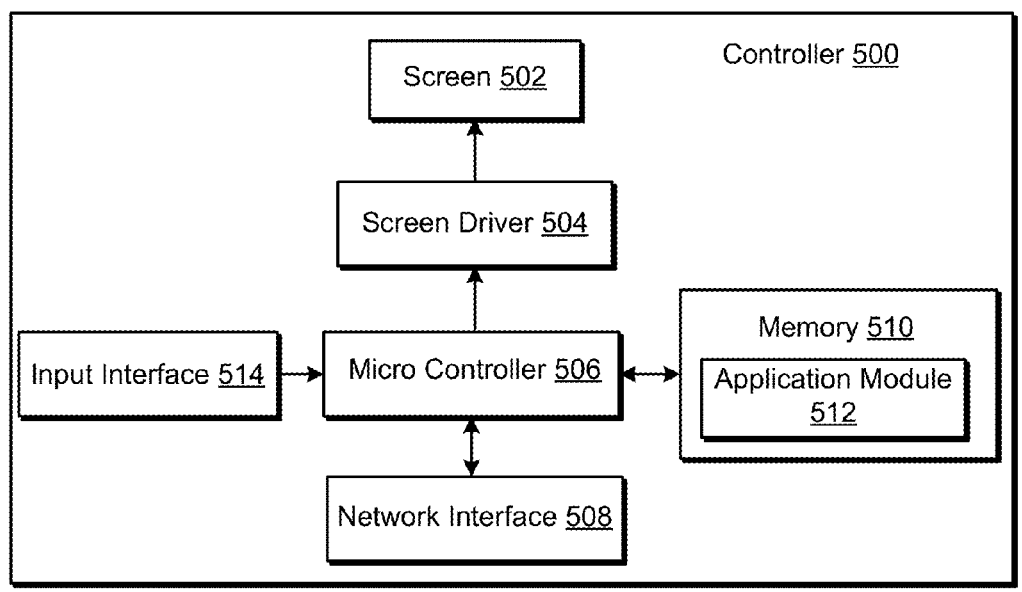
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™ IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
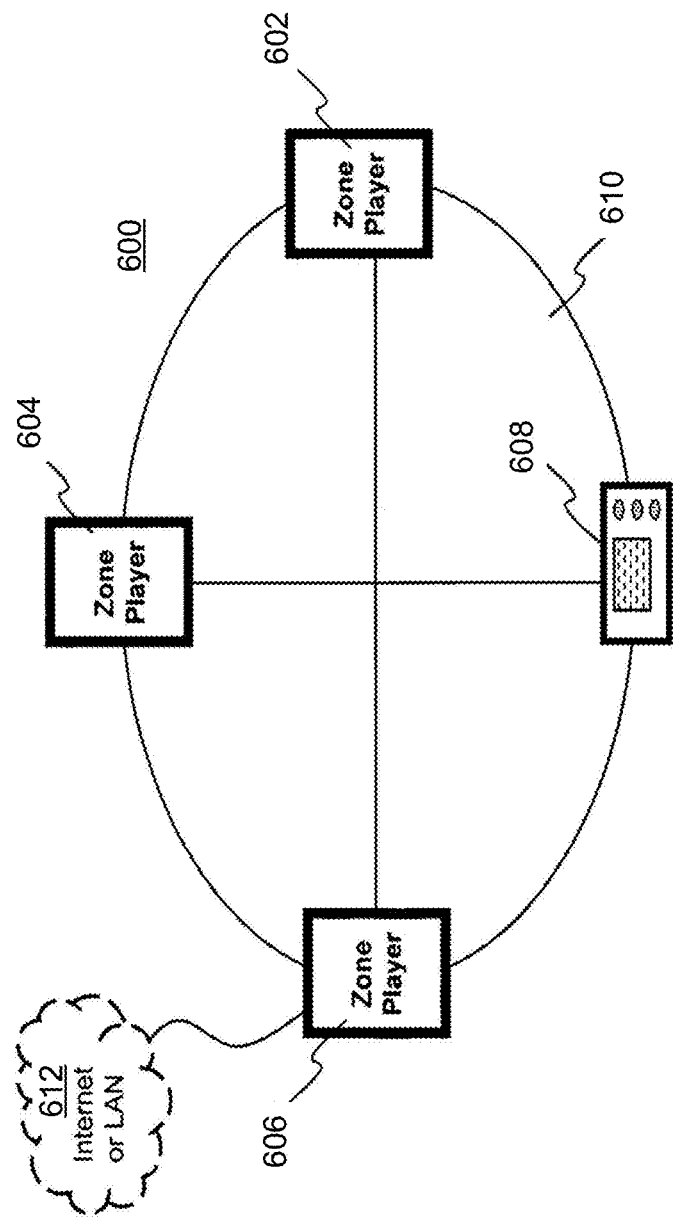
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
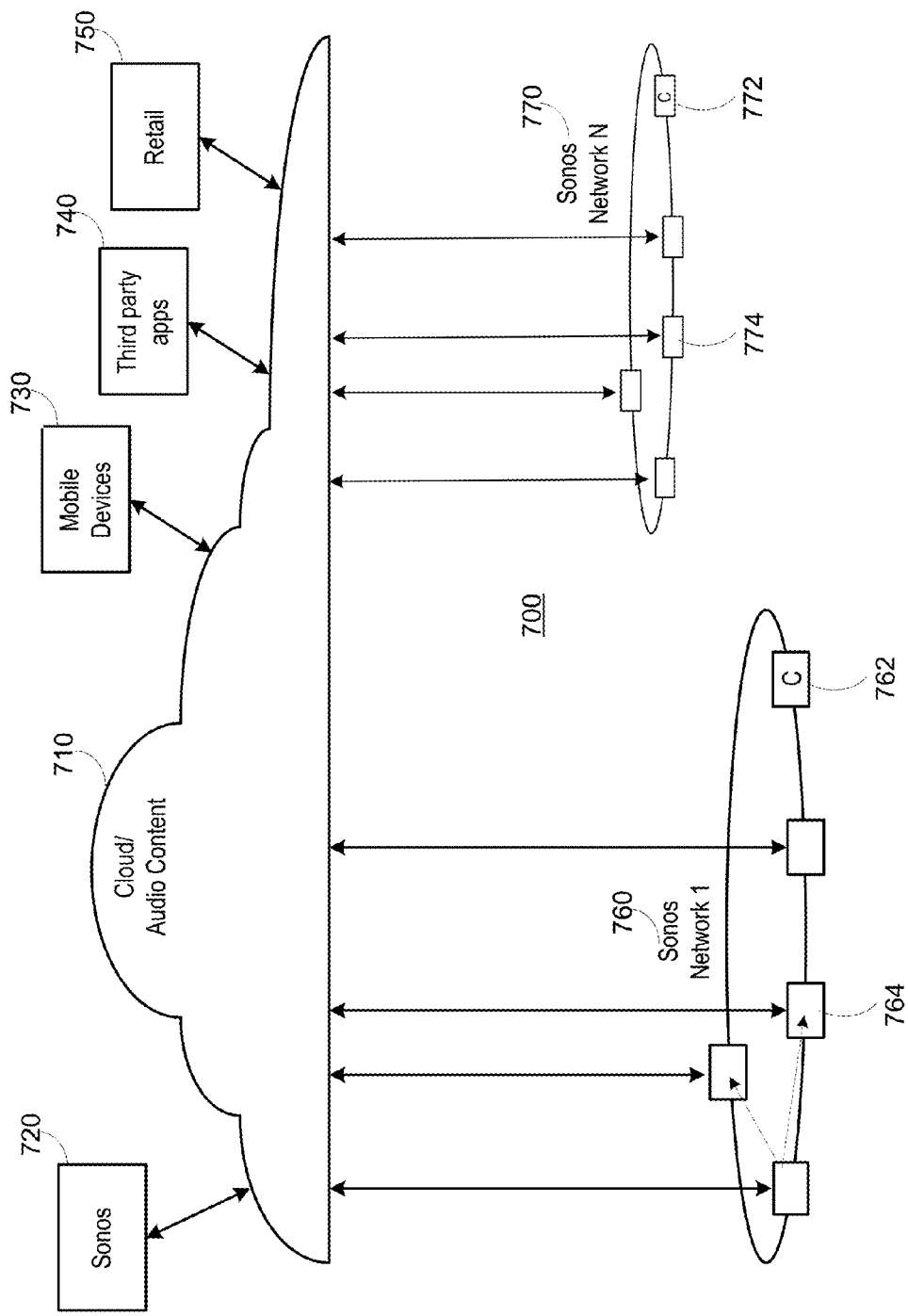
FIG. 7 shows a system of a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia audio system 720 (e.g., Sonos™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Media Experience Social Interface

As mentioned previously, embodiments for sharing a media experience among households are provided herein. The sharing of a media experience among households may allow a user to view information about a media experience of a friend in a different household, within a community, as discussed above. In one example, if the media being experienced is a musical track, the media experience information may include a title of the musical track, an album associated with the musical track, an artist associated with the musical track, a release year associated with the album, a duration associated with the musical track, and so on. If the media being experienced is a video or movie, the media experience information may include a video title, actors in the video, and a director of the video, for example. In another example, the user may share the media experience by experiencing locally a portion of the media being experienced by the friend in the different household.

Figure 8:
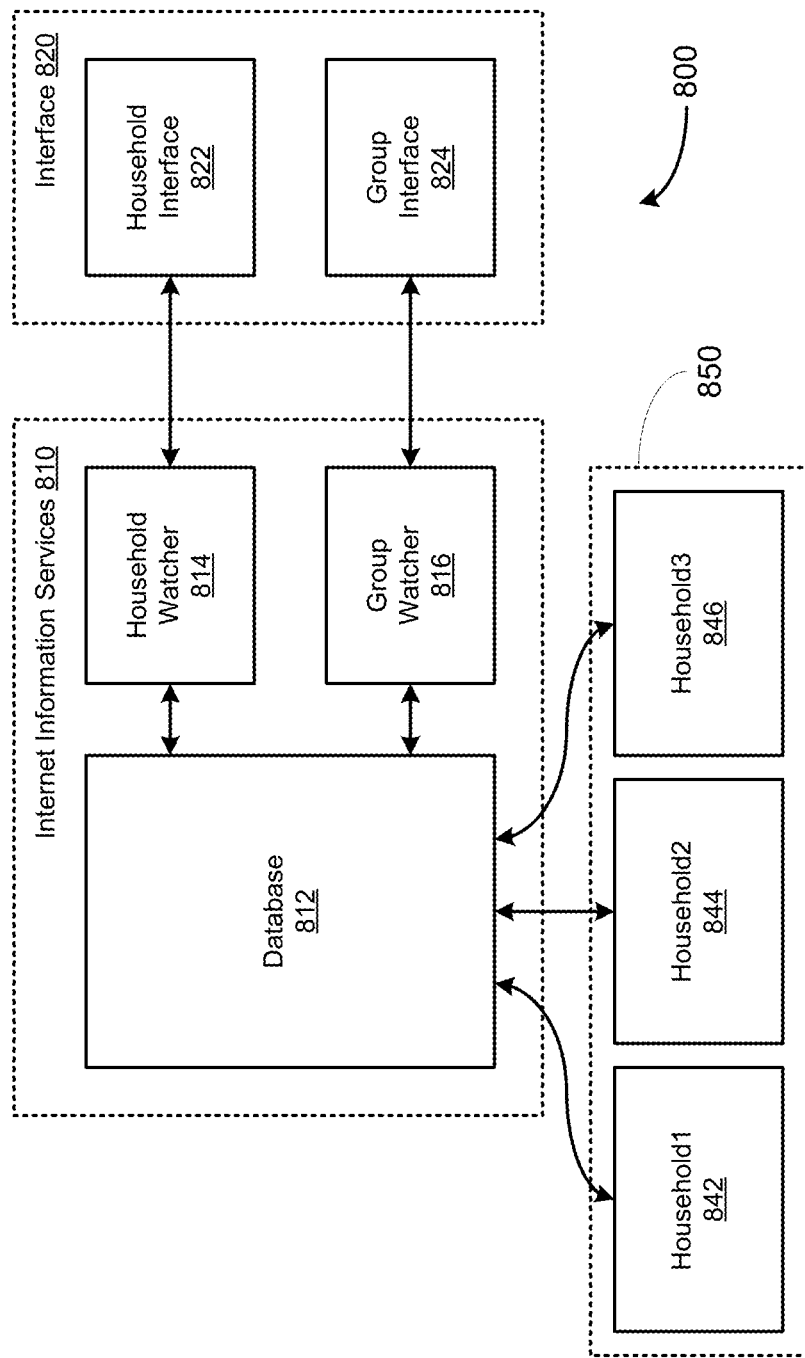
FIG. 8 shows an example system configuration between a media experience social interface and zone player households.

FIG. 8 shows an example system configuration 800 between a media experience social interface 820 and households 850. As shown, the system configuration 800 also includes an Internet Information Service (IIS) 810 in communication with the interface 820 and in communication with the households 850. In one example, each of the households 850 may be in communication with the IIS 810 via a persistent Transmission Control Protocol (TCP) connection. In one case the persistent TCP connection is used to transmit universal plug and play (UPnP) network protocol messages between the households 850 and the IIS 810.

The IIS 810 may include a database 812 configured to be in communication with each of the households 850 to receive media experience information from, and provide data to, each respective household. The database 812 may further be configured to store and update information associated with each respective household as media experience information is received. As shown, the households 850 may include household1 842, household2 844, and household3 846, each in communication with the database 812. One or more of the household1 842, household2 844, and household3 846 may be part of a community, as described above.

Users of households 850 may form a community via invitation from a household in a community (a particular household might have started the community) or through some other defined community formation process. In some embodiments, a household may be included in multiple, different communities. In some embodiments, a community may be formed for a limited duration (e.g., an hour, a day, etc.). In other embodiments, a community exists as long as there is at least one household still part of the community. Other examples exist.

The IIS 810 may further include a household watcher 814, and a group watcher 816. The household watcher 814 may be configured to detect and retrieve updates in the database 812 associated with the households 850. As discussed before, some households may include one or more groups (or zones). Accordingly, the group watcher 816 may be configured to detect and retrieve updates in the database 812 associated with the one or more groups in any of the households 850.

The interface 820 may further include a household interface 822 and a group interface 824. In one example, the household interface 822 and group interface 824 may represent sub-regions of the interface 820. In another example, the household interface 822 and group interface 824 may represent different screens of the interface 820. As shown, the household interface 822 may be in communication with the household watcher 814 to display any updates in the database 812 detected by the household watcher 814. Similarly, the group watcher interface 822 may be in communication with the group watcher 816 to display any updates in the database 812 detected by the group watcher 816.

In one example, data displayed on the interface 820 may only include data associated with households (and associated groups) that the user using the interface 820 has access to. For example, the user may log-on to a website providing the interface 820 by providing access credentials in the form of a username and password (in some embodiments, a username and password may only be required to log-on the first time). Based on the access credentials, the IIS 810 may determine that the user has access to the community of households that includes household1 842 and household2 844. As such, the interface 820 may display, for the user to view, media information associated with household1 842 and household2 844, but not that of household3 846.

As previously described, the interface 820 may be provided on a webpage accessible via a web browser. In this case, the webpage may be implemented according to an Asynchronous JavaScript and XML (AJAX) framework, such that the interface 820 may send data to, and retrieve data from the IIS 810 asynchronously and in the background without interfering with the other information displayed on the interface 820. In other words, when an information update for a group in a household is detected, only the relevant information shown in the group interface 824 will be updated, and a refresh or reload of the webpage may not be necessary.

In one case, upon an initiation of the interface 820, data associated with households accessible by the user may be retrieved via the household watcher 814 for display on the household interface 822, and all group associated data with the same households may be retrieved via the group watcher 816 for display on the household interface 824. After initiation, the household interface 822 and group interface 824 may be updated by the household watcher 814 and group watcher 816, respectively when updates relating to the household and/or groups are detected in the database.

Example implementation of interactions between the households 850, the interface 820, and the IIS 810 may further be discussed in relation to an example flow diagram 900 of FIG. 9A. FIG. 9A shows the example flow diagram 900 for updating a media experience social interface, in accordance with at least some embodiments described herein. Method 900 shown in FIG. 9A presents an embodiment of a method that could be used in a household environment 100 with the systems 200, 202, 204, 300, 400, 500, and 800 for example, in communication with one or more devices, such as devices illustrated in FIGS. 2-5. Method 900 may include one or more operations, functions, or actions as illustrated by one or more of blocks 902-910. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9A may represent circuitry that is wired to perform the specific logical functions in the process.

At block 902, the method 900 may involve providing first client device data for display on a user interface. In connection to FIG. 8 and the discussions above, the user interface may be the interface 820 and the first client device data may be media experience information associated with a household or a group within a household. For instance, a first client device may be a zone player in the household or the group within the household, and the first client device data may indicate a first configuration of the zone player. In this instance, the zone player may be a zone player discussed above in connection to FIGS. 2A-2C. The first configuration of the zone player may include a playback setup (i.e. bonded zone or stereo pair involvement of the zone player) as well as current playback media content, such as a song title, an artist, and an album of a song currently being rendered in the household or group within the household by the zone player.

In one case, block 902 may involve an initiation of the interface 820 as discussed above, such that the configuration associated with the zone player may first be provided for display on the interface 820. In this case, the information provided for display may be a subset of the configuration stored on the database 812 in the IIS 810 depending on relevance, and access credentials of the user accessing the interface 820. For example, if the user is only interested in viewing information on media being experienced in the household of the friend, and not concerned with how the media is being experienced, the playback setup of the zone player in the household or group in the household may not be relevant and therefore not displayed. In another example, if the user also has access rights to the media being experienced by the friend, the user may be able to also experience the same media locally.

As indicated above, interface 820 may be provided in the form of an application on a personal device, such as an APPLE IPOD®, or a smart phone such as an APPLE IPHONE® or any ANDROID™ powered phone. In another example, the social interface may be provided on a controller of one or more media systems in a household. In yet another example, the social interface may be provided on a website on the World Wide Web and accessible over the Internet.

At block 904, the method 900 may involve accessing data in a database associated with an IIS configured to support registration and authentication of the client device with a media system. In one example, the database may be the database 812, and the IIS may be the IIS 810 of FIG. 8. In one example, the data in the database comprises device configuration data associated with the client device. As discussed above, the database 812 may be configured to store and update information associated with each respective household as media experience information is received.

At block 906, the method 900 may involve detecting a change in the device configuration data associated with the client device. As mentioned before, the IIS 810 of FIG. 8 may include the household watcher 814 and the group watcher 816. Accordingly, changes in the device configuration data associated with the client device (zone player in the household and/or group in the household) may be detected by the household watcher 814 and/or the group watcher 816.

The changes in the device configuration data in the database may result from changes in the households 850. For instance, the IIS 810 may be configured to receive data from a household, such as household1 842, if a zone player in the household1 842 begins rendering a different song, begins rendering a different playlist, stops rendering media, and so on. In response to detecting the change in household1 842, the database 812 may be updated to reflect the change.

In addition to the example changes mentioned, other example changes in the device configuration data that may be received by the database 812 and detectable by the household watcher 814 and/or group watcher 816 may include changes in the grouping of zone players in the household, changes to the names of groups or zone players in the household, changes to playlists that may be rendered in the household, or changes to accessible media by the household (modifications to the friend's media service accounts, such as RHAPSODY™, SPOTIFY™, for example). Other examples also exist.

At block 908, the method 900 may involve receiving second client device data from the IIS 810 indicative of a second configuration of the client device and reflective of the change in the device configuration data associated with the client device. Continuing with the example above, upon detection of a change in the device configuration data in the database 812, the second client device data, indicative of the updates or changes to the household1 842 may be retrieved by the household watcher 814 and/or group watcher 816.

As described above in an example, a portion of the updated device configuration data may be retrieved as the second client device data. In other words, some of the updated device configuration data may not be relevant, or accessible to the user, and may not be retrieved by the household watcher 814 and/or group watcher 816.

At block 910, the method 900 may involve providing to the user interface 820 the second client device data for display on the user interface. As with block 902, the relevant information from the database 812 of the IIS 810 may be provided. In one case, contrary to the example discussed above where only a portion of the updated device configuration data may be retrieved, all of the updated device configuration data may be retrieved by the household watcher 814 and/or group watcher 816. In this case, the user interface 820 may be configured to determine what portions of the retrieved second client device data is to be provided on the user interface 820.

FIG. 9B shows an example flow diagram 950 for providing a media experience social interface, in accordance with at least some embodiments described herein. In one example, the flow diagram 950 may represent how the first and/or second client device data are provided on the user interface 820 in blocks 902 and 910, respectively, of method 900. Method 950 shown in FIG. 9B presents an embodiment of a method that could be used in the environment 100 with the systems 200, 202, 204, 300, 400, 500, and 800 for example, in communication with one or more devices, such as devices illustrated in FIGS. 2-5. Method 950 may include one or more operations, functions, or actions as illustrated by one or more of blocks 952-956. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 950 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 950 and other processes and methods disclosed herein, each block in FIG. 9B may represent circuitry that is wired to perform the specific logical functions in the process.

Figure 10A:
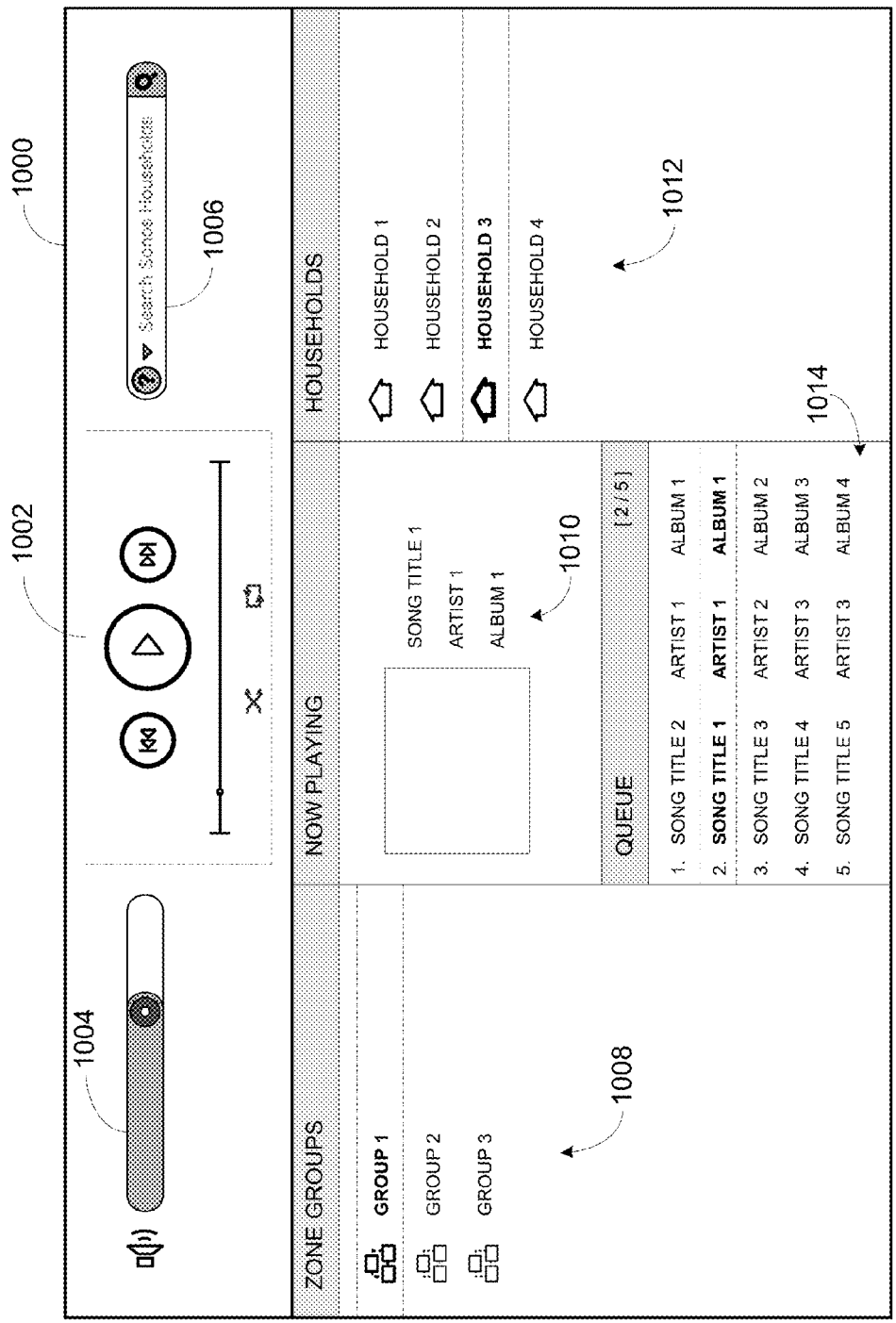
FIG. 10A shows an example first media experience social interface.

At block 952, the method 950 may involve displaying on a display screen a representation corresponding to each household of a community of households. In one example, the display screen may be associated with one of the households in the community of households. In other words, the display screen may be accessed by a user who is a member of the community. FIG. 10A shows an example first media experience social interface 1000, which may be displayed on the display screen. As suggested previously, the display screen may be that of a mobile device or personal computer screen. As shown, the interface 1000 includes a households region 1012 with household representations HOUSEHOLD 1, HOUSEHOLD 2, HOUSEHOLD 3, and HOUSEHOLD 4. In connection to the embodiments discussed previously, each of the household representations may be associated with a different household in a community. As the display screen may be associated with one of the households in the community, the household associated with the display screen providing the interface 1000 may be any one of HOUSEHOLD 1, HOUSEHOLD 2, HOUSEHOLD 3, and HOUSEHOLD 4.

In one example, one of the household representations may be selected if the user of the interface 1000 wishes to view media information associated with a household represented in the households region 1012. In one case, if HOUSEHOLD 3 is selected, the representation HOUSEHOLD 3 may be graphically distinguishable over the other household representations in the households region 1012. As shown, HOUSEHOLD 3 may be outlined and/or be in bold to indicate that HOUSEHOLD 3 has been selected. In other examples, HOUSEHOLD 3 may be graphically distinguished by being provided in a different color, different font, or different font size. Other example distinguishing features may also be possible.

As indicated above, each household shown in the households region 1012 may include one or more associated zone player groups configured to render the media in synchrony. For example, HOUSEHOLD 3 may include GROUP 1, GROUP 2, and GROUP 3. Accordingly, at block 954, the method 950 may involve displaying on the display screen a representation of a zone player group associated with a household. In one example, displaying the representation of the zone player group associated with the household may be in response to receipt of a command to select the household. As such, block 954 may involve displaying in a groups region 1008 group representations of GROUP 1, GROUP 2, and GROUP 3 representative of zone player groups associated with HOUSEHOLD 3. In this case, the display of the group representations of GROUP 1, GROUP 2, and GROUP 3 in the groups region 1008 may be in response to a selection of HOUSEHOLD 3 in the households region 1012, as suggested above.

As indicated previously, the household associated with the display screen providing the interface 1000 may be any one of HOUSEHOLD 1, HOUSEHOLD 2, HOUSEHOLD 3, or HOUSEHOLD 4. In some cases, the household associated with the display screen may not be HOUSEHOLD 3. In other words, the display screen providing the interface 1000 may be associated with a household in the community of households that is different from the household for which the representation of the zone player group and the representation of the media are displayed. In either case, one of the group representations may then be selected if the user wishes to view media information associated with a group represented in the groups region 1008. For instance, GROUP 1 may be selected, and accordingly, GROUP 1 may be graphically distinguishable over the other group representations in the groups region 1008.

Upon selection of a group, such as GROUP 1 in the groups region 1008, at block 956, the method 950 may involve displaying on the display screen a representation of media being rendered by the zone player group, GROUP 1. As shown on the interface 1000 of FIG. 10A, a representation of media being rendered by zone players in the remote zone player group, GROUP 1 may be provided in a now playing region 1010. In one case, the media representation of the media indicates information associated with the media being rendered. For example, as previously discussed, if the media being rendered is a musical track, the media experience information may include a title of the musical track, an album associated with the musical track, an artist associated with the musical track, a release year associated with the album, a duration associated with the musical track, or a record company associated with the album. In addition to the now playing region 1010 upon selection of GROUP 1, the interface 1000 may also include a display of an available media representation in a media queue region 1014. Because, as discussed before, different households, and different groups within a household may have access to different media, and/or may be capable of rendering different media, displaying available media in the media queue region 1014 may further involve determining available media to be rendered by the remote zone player group, and displaying all media accessible by zone players in the remote zone player group. In one case, if given access, the available media representation may be selectable by the user to cause the rendering of the media content by the remote zone player group.

In one example, the media queue region 1014 may provide a playlist or playback queue presently being rendered by the zone players in the group, and may therefore include media currently being rendered by the group and for which information is provided in the now playing region 1010. In this case, the now playing media may be graphically distinguishable over the other media in the available media representation 1014, as shown on the interface 1000.

While block 956 as discussed above may imply that displaying of the now playing region 1010 is upon a selection of a group representation in the groups region 1008, other embodiments may involve displaying the now playing region 1010 and media queue region 1014 upon selection of a household representation in the households region 1012. This may be the case when only one group exists within the selection household. This may also be the case if the interface is configured to select, for example, the first group representation in the groups region 1008 by default when a household is selected. In other words, in some embodiments, the selection of a group representation may be automatically made without further input from the user after the user selects a household representation. Similarly, a household representation (such as the first household representation in the households region, or the only household available) may also be configured to be automatically selected upon initiation of the interface 1000.

In addition to the households region 1012, the groups region 1008, the now playing region 1010, and the media queue region 1014, the interface 1000 may also include a controls region 1002, which may include control icons representative of available playback controls selectable to control the rendering of the media by the zone player in the remote zone player group. As previously discussed, the user of the interface 1000 may be given access to control the media experience of the friend in the household. In such a case, the available playback controls in the controls region 1002 may include icons to cause the associated remote zone players in the household to play, play next, play previous, shuffle, or repeat media in the playback queue (such as that shown in the media queue region 1014). In the case the user does not have access to control the media experience, the controls region 1002 may not be provided, or may be provided with the control icons grayed out to indicate that the control options are not available.

Also shown in FIG. 10A, the controls region 1002 of the interface 1000 may further include a playback progress bar representative of a playback progress of the media being rendered by zone players in the remote zone player group. In some examples, the playback progress bar may be selected and used to adjust the playback progress of the media being experienced at the household.

In addition to the controls region 1002, the interface 1000 may also include other controls such as a volume bar 1004 representing the volume at which the media being rendered is experienced at the household. In this case, if the user has control access to the media experience of the household or remote zone player group, the user may adjust the volume level using the volume bar 1004 to adjust the playback volume of the remote zone player group.

Further shown in FIG. 10A is a search box 1006 on the interface 1000. In one example, as shown, the search box 1006 may be used to find by text or drop down selection a specific household in the community. In other examples, the search box 1006 may be used to find specific media, or groups within a specific household, or a community.

Figure 10B:
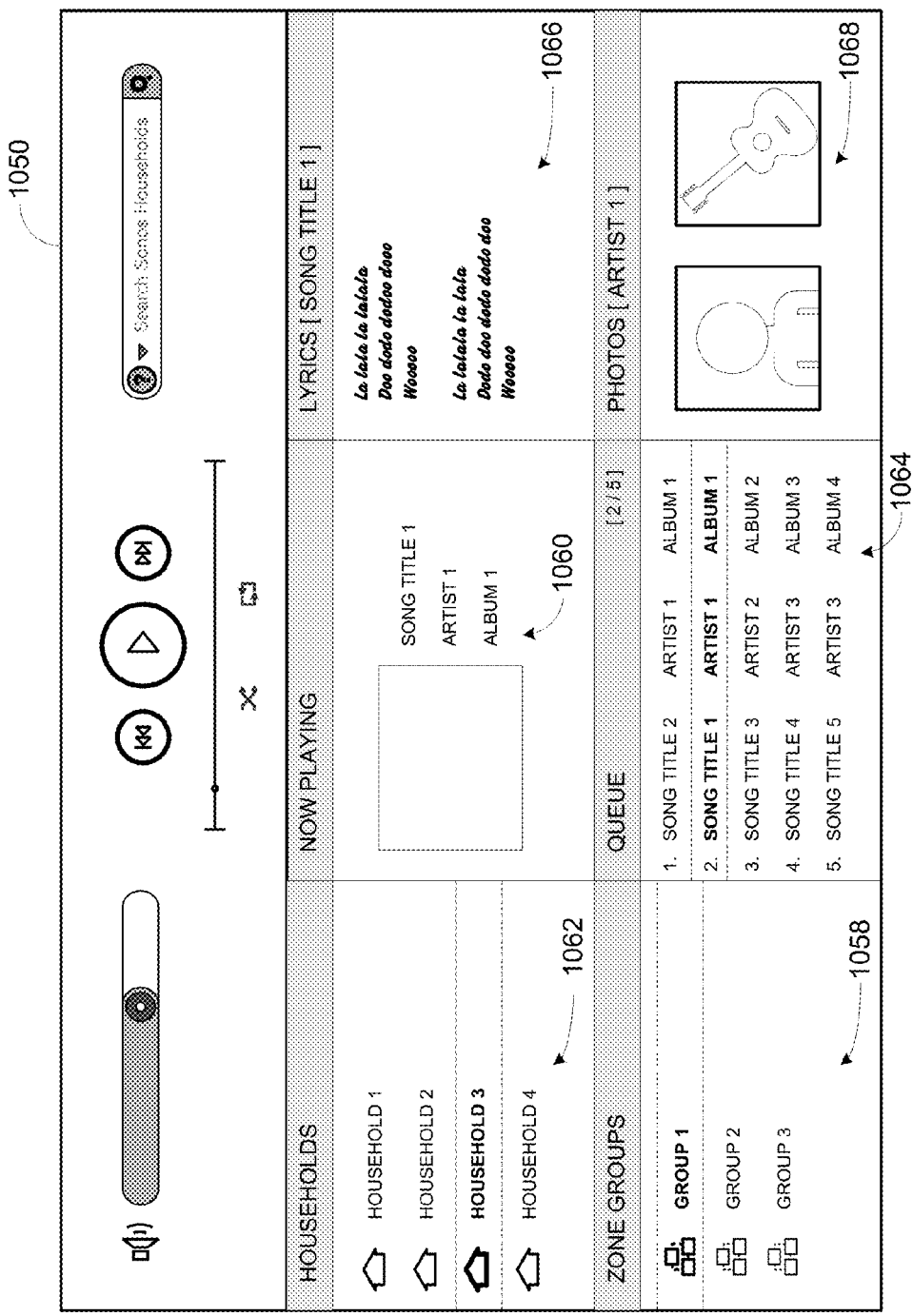
FIG. 10B shows an example second media experience social interface.

In one example, to further enhance the experience of the user wishing to view information on media being experienced by another household, additional information may be provided on the interface 1000. FIG. 10B shows an example second media experience social interface 1050. As shown, the interface 1050 may include a households region 1062, a groups region 1058, a now playing region 1060, and a media queue region 1064, similar to the households region 1012, groups region 1008, now playing region 1010, and media queue region 1014, respectively, of the interface 1000 of FIG. 10A. In addition to the interface 1000, the interface 1050 may include a lyrics region 1006 displaying a textual representation of lyrics associated with the media being rendered, if the media is a musical track. The interface 1050 may also include a photos region 1068 showing images associated with an artist of the musical track. Other information may also be provided on the interface 1050, such as a biography of the artist, or interesting facts about the musical track or album. Other examples are also possible.

In further embodiments of the present application that may not be explicitly shown in FIG. 10A or 10B, a representation of each zone player in a zone player group may be provided on the display screen in response to a selection of the zone player group. For instance, if GROUP 1 includes two zone players rendering media as a studio pair, selection of GROUP 1 may result in providing on the display screen representations of a left zone player and a right zone player of GROUP 1. In such embodiments, modifications of groupings of zone players within a household, or zone player groups within the household may further be made in response to receiving commands from a user indicating such modifications. In one example, the left and right zone players may be modified to each play both left and right channels of the media content. In another example, one of the zone players may be removed from GROUP 1 and added to GROUP 2. In a yet another example, one or more zone players from GROUP 2 may be added to GROUP 1. As with other means of controlling the media experience of a remote household, the ability to modify the groupings of zone players via the interface 1000 or 1050 may depend on the access rights given to the user of the interface 1000 or 1050.

As discussed in an example above, a friend may give the user control access to the media experience at the household or group. This may be in addition to the friend giving the user any access at all to the media experience at the household or group. For instance, the present application may allow sharing of media experience information between households only to the extent that an owner of a household or group allows. In other words, media experience sharing rights may be determined by the owner of the household or group.

Figure 11:
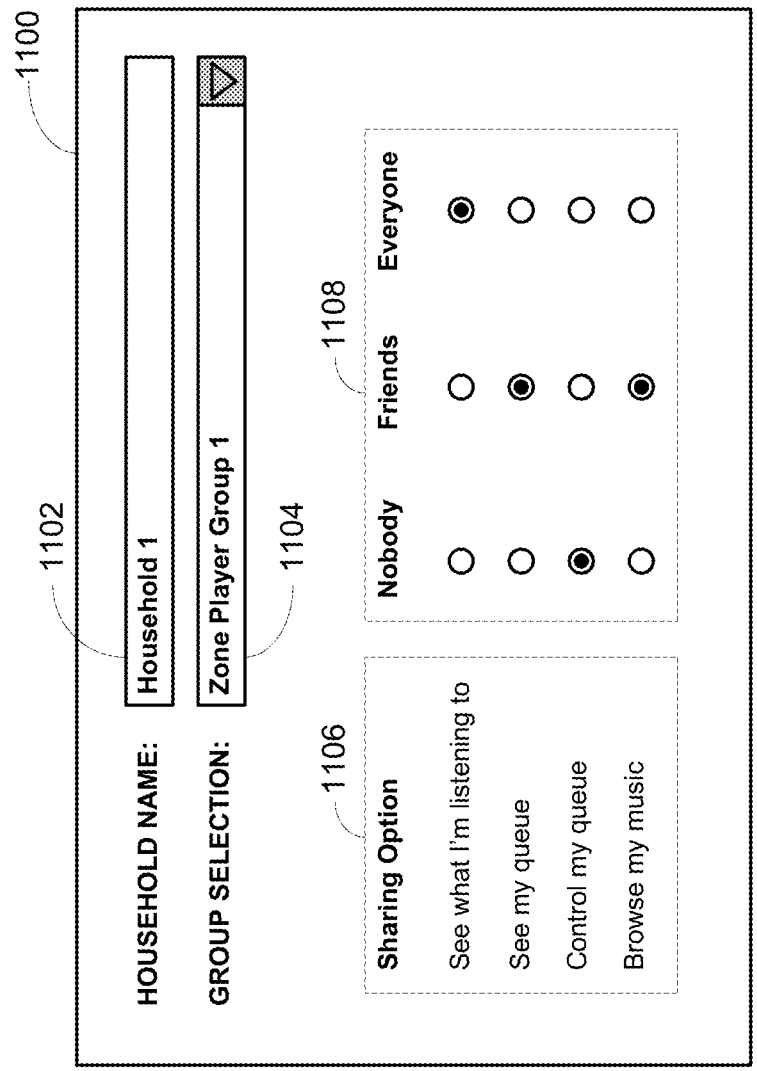
FIG. 11 shows an example interface for modifying a media experience sharing configuration.

FIG. 11 shows an example interface 1100 for configuring a media experience sharing configuration. The interface 1100 may also be used to join a community and set up parameters. In one example, the interface 1100 may be used by a user of a first household to determine what level of access a user of second household in the community may have to the first household's media experience.

As shown, the interface 1100 may include a household name box 1102, a group selection box 1104, sharing options 1106, and sharing scope 1108. The household name box 1102 may display an editable name of a household representative of the household on the network interface. As such, one may edit the name of the household to be displayed to others. The group selection box 1104 may then provide the user of the first household a selection of groups in the first household. In one example, a selection of a group in the first household may allow the user to edit a name of the selected group. In another example, the selection of the group may show the sharing options 1106 and sharing scope 1108 associated with the selected group.

As shown, the sharing options 1106 of the group may include example types of media experience sharing such as allowing the network interface to view media being rendered by one or more zone player groups in the first household, view all media accessible by one or more zone player groups in the first household, control rendering of the media being rendered by one or more zone player groups in the first household, or view media in a playlist being rendered by one or more zone player groups in the first household. Also as shown, the sharing scope 1108 may include example scope of sharing such as allowing access to the one or more zone player groups in the first household via the network interface by nobody, everyone in communication with the first household, or users associated with other households in a community of households including the first household.

As such, a sharing scope may correspond to a sharing option. For instance, as shown, the sharing scope of "nobody" has been selected for the sharing option of "control my queue." Accordingly, no one (outside of the first household) has the access rights to control the queue of the selected group shown in the group selection box 1104 for the household. In another example, as shown, the sharing scope of "everybody" has been selected for the sharing option of "see what I'm listening to." Accordingly, anyone with access to the social interface, and in communication with the first household via a community may view what is being rendered by the selected group in the household. Other examples are also possible. For instance, interface 1100 may also enable the user of the first household to select a community from a plurality of communities, if the user is a member of multiple communities. As such, different sharing options and sharing scope may be set for each community.

In addition to allowing a user of the first household to view the sharing configurations, the interface 1100 of FIG. 11 may also allow the user to modify the sharing configurations. For example, the user may select a different sharing scope in the sharing scopes 1108 for a different sharing option in the sharing options 1106. In such a case, the interface 1100 may further include a selectable icon, such as a submit button to apply the changes in sharing configurations to the selected group in the household. In another case, any selection of a sharing scope or sharing option may automatically be applied to the selected group in the household.

In another example, the user may select a corresponding sharing scope for each sharing option before selecting a group via the group selection box 1104. In such a case, the interface 1100 may be configured to apply the selected sharing configuration to the selected group rather than simply displaying the sharing configurations of the selected group, as indicated above. Other example implementations of the interface 1100 may also be possible.

VIII. Conclusion

The present application discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As provided in the embodiments discussed above, the present application provides a social interface for sharing media experience information between households. In one aspect, a method for displaying media information for a household of a community of households on a display screen is provided. The method involves displaying on a display screen a representation of a zone player group associated with a household responsive to receipt of a command to select the household from a community of households, and displaying on the display screen a representation of media being rendered by the zone player group, wherein the representation of the media indicates information associated with the media being rendered.

In another aspect, a non-transitory computer readable medium is provided. The non-transitory computer readable medium has stored thereon instructions executable by a computing device to cause the computing device to perform functions. The functions include displaying on a display screen a representation of a zone player group associated with a household responsive to receipt of a command to select the household from a community of households, and displaying on the display screen a representation of media being rendered by the zone player group, wherein the representation of the media indicates information associated with the media being rendered.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A computing device comprising:
   a graphical display;
   one or more processors; and
   a tangible, non-transitory computer-readable medium having stored thereon instructions that, when executed by the one or more processors, cause the computing device to perform functions comprising:
   displaying, on the graphical display, representations comprising: (i) representations of a plurality of households, (ii) an indication of a selected household among the representation of the plurality of households, (iii) representations of one or more zones within the selected household, and (iv) a representation of media being played by a selected zone of the one or more zones;
   while displaying the representations, receiving from a server, data indicating updated information associated with the plurality of households; and
   in response to receiving the data indicating updated information associated with the plurality of households, updating the graphical display to display at least an updated representation of media being played by the selected zone based on the received updated information associated with the plurality of households.

2. The computing device of claim 1, wherein the representations of the one or more zones indicate a first configuration of the one or more zones, wherein the updated information indicates a second configuration of the one or more zones, and wherein updating the graphical display further comprises:
   updating the graphical display to display representations of the one or more zones to indicate the second configuration of the one or more zones.

3. The computing device of claim 1, wherein the functions comprise:
   prior to displaying the representations, receiving, via a user interface provided on the graphical display, an input indicating a selection of the selected household.

4. The computing device of claim 1, wherein the functions comprise:
   prior to displaying the representations, receiving via a user interface provided on the graphical display, an input indicating a selection of the selected zone.

5. The computing device of claim 1, wherein the selected zone is a zone group comprising two or more zones playing the media in synchrony.

6. The computing device of claim 1, wherein the functions further comprise:
   prior to displaying the representations, transmitting, to the server, a request for information associated with the plurality of households; and
   receiving, from the server, the information associated with the plurality of households, wherein displaying on the graphical display, the representations comprises displaying the representations based on the received information associated with the plurality of households.

7. The computing device of claim 1, wherein the functions further comprise:
   receiving, via a user interface provided on the graphical display, an input indicating a selection of a second household in the plurality of households; and
   responsive to receiving the input, updating the graphical display to display updated representations based on the updated information associated with the plurality of households, wherein the updated representations comprise: (i) an indication of the second household among the representation of the plurality of households, (ii) representations of one or more zones within the second household, and (iii) a representation of media being rendered by a selected zone of the one or more zones within the second household.

8. The computing device of claim 1, wherein the computing device is a controller device configured to control media playback within a household of the plurality of households.

9. A method comprising:
   displaying, by a computing device on a graphical display, representations comprising: (i) representations of a plurality of households, (ii) an indication of a selected household among the representation of the plurality of households, (iii) representations of one or more zones within the selected household, and (iv) a representation of media being played by a selected zone of the one or more zones;
   while displaying the representations, receiving by the computing device from a server, data indicating updated information associated with the plurality of households; and
   in response to receiving the data indicating updated information associated with the plurality of households, updating by the computing device, the graphical display to display at least an updated representation of media being played by the selected zone based on the received updated information associated with the plurality of households.

10. The method of claim 9, wherein the representations of the one or more zones indicate a first configuration of the one or more zones, wherein the updated information indicates a second configuration of the one or more zones, and wherein updating the graphical display further comprises:
updating the graphical display to display representations of the one or more zones to indicate the second configuration of the one or more zones.

11. The method of claim 9, further comprising:
prior to displaying the representations, receiving, via a user interface provided on the graphical display, an input indicating a selection of the selected household.

12. The method of claim 9, further comprising:
prior to displaying the representations, receiving, via a user interface provided on the graphical display, an input indicating a selection of the selected zone.

13. The method of claim 9, further comprising:
prior to displaying the representations, transmitting, by the computing device to the server, a request for information associated with the plurality of households; and
receiving, by the computing device from the server, the information associated with the plurality of households, wherein displaying on the graphical display, the representations comprises displaying the representations based on the received information associated with the plurality of households.

14. The method of claim 9, further comprising:
receiving by the computing device via a user interface provided on the graphical display, an input indicating a selection of a second household in the plurality of households; and
responsive to receiving the input, updating, by the computing device, the graphical display to display updated representations based on the updated information associated with the plurality of households, wherein the updated representations comprise: (i) an indication of the second household among the representation of the plurality of households, (ii) representations of one or more zones within the second household, and (iii) a representation of media being rendered by a selected zone of the one or more zones within the second household.

15. A tangible, non-transitory computer-readable medium having stored thereon instructions that, when executed by one or more processors, cause a computing device to perform functions comprising:
displaying on a graphical display, representations comprising: (i) representations of a plurality of households, (ii) an indication of a selected household among the representation of the plurality of households, (iii) representations of one or more zones within the selected household, and (iv) a representation of media being rendered by a selected zone of the one or more zones;
while displaying the representations, receiving from a server, data indicating updated information associated with the plurality of households; and
in response to receiving the data indicating updated information associated with the plurality of households, updating the graphical display to display at least an updated representation of media being played by the selected zone based on the received updated information associated with the plurality of households.

16. The tangible, non-transitory computer-readable medium of claim 15, wherein the representations of the one or more zones indicate a first configuration of the one or more zones, wherein the updated information indicates a second configuration of the one or more zones, and wherein updating the graphical display further comprises:
updating the graphical display to display representations of the one or more zones to indicate the second configuration of the one or more zones.

17. The tangible, non-transitory computer-readable medium of claim 15, wherein the functions further comprise:
prior to displaying the representations, receiving, via a user interface provided on the graphical display, an input indicating a selection of the selected household.

18. The tangible, non-transitory computer-readable medium of claim 15, wherein the functions further comprise:
prior to displaying the representations, receiving, via a user interface provided on the graphical display, an input indicating a selection of the selected zone.

19. The tangible, non-transitory computer-readable medium of claim 15, wherein the functions further comprise:
prior to displaying the representations, transmitting, to the server, a request for information associated with the plurality of households; and
receiving, from the server, the information associated with the plurality of households, wherein displaying on the graphical display, the representations comprises displaying the representations based on the received information associated with the plurality of households.

20. The tangible, non-transitory computer-readable medium of claim 15, wherein the functions further comprise:
receiving, via a user interface provided on the graphical display, an input indicating a selection of a second household in the plurality of households; and
responsive to receiving the input, updating the graphical display to display updated representations based on the updated information associated with the plurality of households, wherein the updated representations comprise: (i) an indication of the second household among the representation of the plurality of households, (ii) representations of one or more zones within the second household, and (iii) a representation of media being rendered by a selected zone of the one or more zones within the second household.

* * * * *